United States Patent
Lindemann et al.

(10) Patent No.: US 7,467,268 B2
(45) Date of Patent: Dec. 16, 2008

(54) CONCURRENT DATA RESTORE AND BACKGROUND COPY OPERATIONS IN STORAGE NETWORKS

(75) Inventors: Aaron Lindemann, Boise, ID (US); Xia Xu, Boise, ID (US); Rodger Daniels, Boise, ID (US); Lee Nelson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 278 days.

(21) Appl. No.: 11/404,240

(22) Filed: Apr. 14, 2006

(65) Prior Publication Data

US 2007/0245104 A1    Oct. 18, 2007

(51) Int. Cl.
    *G06F 12/04* (2006.01)
(52) U.S. Cl. .................... 711/162; 711/113
(58) Field of Classification Search ............ 711/162, 711/161, 170, 113, 114; 714/4, 6
    See application file for complete search history.

(56) References Cited

U.S. PATENT DOCUMENTS

| | | | |
|---|---|---|---|
| 5,923,876 A | 7/1999 | Teague | |
| 6,161,192 A | 12/2000 | Lubbers | |
| 6,170,063 B1 | 1/2001 | Golding | |
| 6,182,198 B1* | 1/2001 | Hubis et al. ............ 711/162 |
| 6,295,578 B1 | 9/2001 | Dimitroff | |
| 6,397,293 B2 | 5/2002 | Shrader | |
| 6,487,636 B1 | 11/2002 | Dolphin | |
| 6,490,122 B1 | 12/2002 | Holmquist et al. | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliott | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |

(Continued)

*Primary Examiner*—Pierre-Michel Bataille

(57) ABSTRACT

Exemplary storage network architectures, data architectures, and methods for data restore operation are disclosed. In one embodiment, a storage device comprises a processor, a memory module communicatively connected to the processor, and logic instructions in the memory module which, when executed by the processor, configure the processor to receive a signal that identifies a source volume and a first target snapshot that represents a point in time copy of the source volume, update metadata to define an restore relationship between the first target snapshot and the source volume, execute a background copy process between the first target snapshot and the source volume, and manage input/output operations during the background copy process to permit input/output operations to the source volume during the background copy process.

27 Claims, 15 Drawing Sheets

U.S. PATENT DOCUMENTS

| | | | |
|---|---|---|---|
| 6,742,020 B1 | 5/2004 | Dimitroff | |
| 6,745,207 B2 | 6/2004 | Reuter | |
| 6,763,409 B1 | 7/2004 | Elliott | |
| 6,772,231 B2 | 8/2004 | Reuter | |
| 6,775,790 B2 | 8/2004 | Reuter | |
| 6,795,904 B1 | 9/2004 | Kamvysselis | |
| 6,799,258 B1 * | 9/2004 | Linde | 711/162 |
| 6,802,023 B2 | 10/2004 | Oldfield | |
| 6,807,605 B2 | 10/2004 | Umberger | |
| 6,817,522 B2 | 11/2004 | Brignone | |
| 6,823,453 B1 | 11/2004 | Hagerman | |
| 6,839,824 B2 | 1/2005 | Camble | |
| 6,842,833 B1 | 1/2005 | Phillips | |
| 6,845,403 B2 | 1/2005 | Chadalapaka | |
| 7,024,530 B2 * | 4/2006 | Jarvis et al. | 711/162 |
| 7,047,390 B2 * | 5/2006 | Factor et al. | 711/162 |
| 7,055,009 B2 * | 5/2006 | Factor et al. | 711/162 |
| 7,085,892 B2 * | 8/2006 | Martinez et al. | 711/162 |
| 7,124,128 B2 * | 10/2006 | Springer et al. | 707/3 |
| 2002/0019863 A1 | 2/2002 | Reuter | |
| 2002/0019908 A1 | 2/2002 | Reuter | |
| 2002/0019920 A1 | 2/2002 | Reuter | |
| 2002/0019922 A1 | 2/2002 | Reuter | |
| 2002/0019923 A1 | 2/2002 | Reuter | |
| 2002/0048284 A1 | 4/2002 | Moulton | |
| 2002/0188800 A1 | 12/2002 | Tomaszewski | |
| 2003/0051109 A1 | 3/2003 | Cochran | |
| 2003/0056038 A1 | 3/2003 | Cochran | |
| 2003/0063134 A1 | 4/2003 | Lord | |
| 2003/0074492 A1 | 4/2003 | Cochran | |
| 2003/0079014 A1 | 4/2003 | Lubbers | |
| 2003/0079074 A1 | 4/2003 | Sicola | |
| 2003/0079082 A1 | 4/2003 | Sicola | |
| 2003/0079083 A1 | 4/2003 | Lubbers | |
| 2003/0079102 A1 | 4/2003 | Lubbers | |
| 2003/0079156 A1 | 4/2003 | Sicola | |
| 2003/0084241 A1 | 5/2003 | Lubbers | |
| 2003/0101318 A1 | 5/2003 | Kaga | |
| 2003/0110237 A1 | 6/2003 | Kitamura | |
| 2003/0126315 A1 | 7/2003 | Tan | |
| 2003/0126347 A1 | 7/2003 | Tan | |
| 2003/0140191 A1 | 7/2003 | McGowen | |
| 2003/0145045 A1 | 7/2003 | Pellegrino | |
| 2003/0145130 A1 | 7/2003 | Schultz | |
| 2003/0170012 A1 | 9/2003 | Cochran | |
| 2003/0177323 A1 | 9/2003 | Popp | |
| 2003/0187847 A1 | 10/2003 | Lubbers | |
| 2003/0187947 A1 | 10/2003 | Lubbers | |
| 2003/0188085 A1 | 10/2003 | Arakawa | |
| 2003/0188114 A1 | 10/2003 | Lubbers | |
| 2003/0188119 A1 | 10/2003 | Lubbers | |
| 2003/0188153 A1 | 10/2003 | Demoff | |
| 2003/0188218 A1 | 10/2003 | Lubbers | |
| 2003/0188229 A1 | 10/2003 | Lubbers | |
| 2003/0188233 A1 | 10/2003 | Lubbers | |
| 2003/0191909 A1 | 10/2003 | Asano | |
| 2003/0191919 A1 | 10/2003 | Sato | |
| 2003/0196023 A1 | 10/2003 | Dickson | |
| 2003/0212781 A1 | 11/2003 | Kaneda | |
| 2003/0229651 A1 | 12/2003 | Mizuno | |
| 2003/0236953 A1 | 12/2003 | Grief | |
| 2004/0019740 A1 | 1/2004 | Nakayama | |
| 2004/0022546 A1 | 2/2004 | Cochran | |
| 2004/0024838 A1 | 2/2004 | Cochran | |
| 2004/0024961 A1 | 2/2004 | Cochran | |
| 2004/0030727 A1 | 2/2004 | Armangau | |
| 2004/0030846 A1 | 2/2004 | Armangau | |
| 2004/0049634 A1 | 3/2004 | Cochran | |
| 2004/0078533 A1 * | 4/2004 | Lee et al. | 711/162 |
| 2004/0078638 A1 | 4/2004 | Cochran | |
| 2004/0078641 A1 | 4/2004 | Fleischmann | |
| 2004/0128404 A1 | 7/2004 | Cochran | |
| 2004/0168034 A1 | 8/2004 | Sigeo | |
| 2004/0215602 A1 | 10/2004 | Cioccarelli | |
| 2004/0230859 A1 | 11/2004 | Cochran | |
| 2004/0260870 A1 * | 12/2004 | Factor et al. | 711/112 |
| 2004/0260872 A1 * | 12/2004 | Depta | 711/113 |
| 2004/0267706 A1 * | 12/2004 | Springer et al. | 707/3 |
| 2004/0267959 A1 | 12/2004 | Cochran | |
| 2006/0123211 A1 * | 6/2006 | Derk et al. | 711/162 |
| 2006/0143412 A1 * | 6/2006 | Armangau | 711/162 |
| 2006/0168397 A1 * | 7/2006 | Wightwick et al. | 711/114 |

* cited by examiner

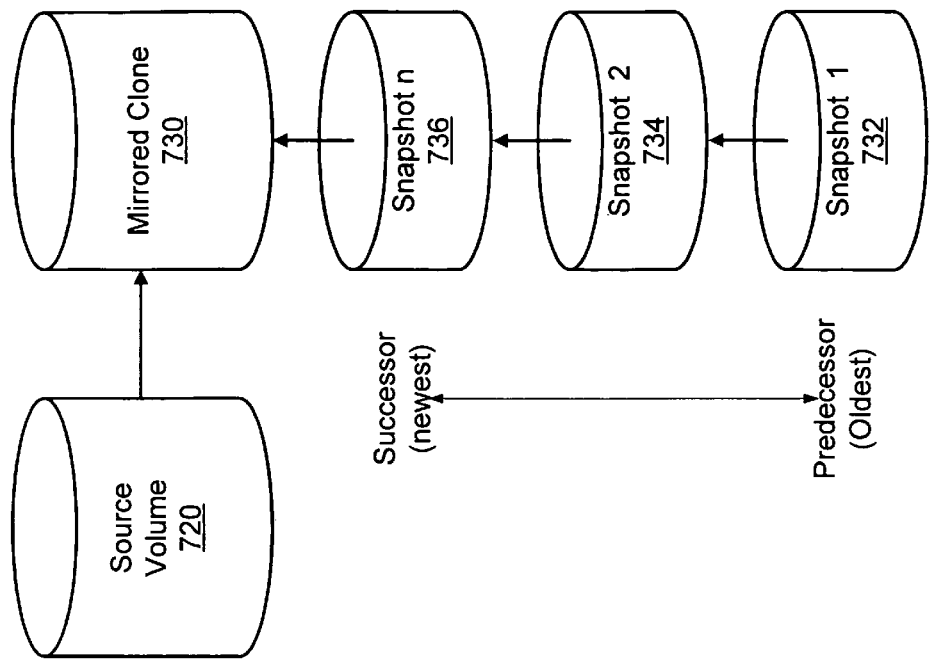
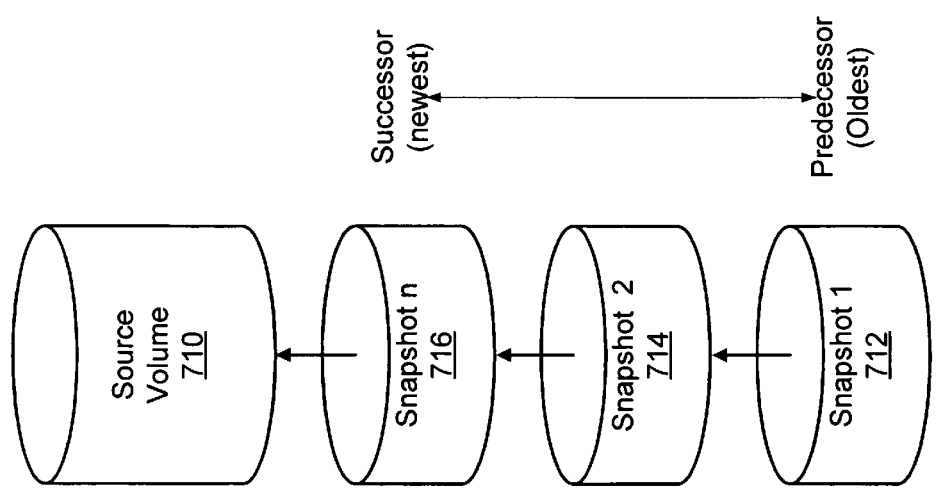

CONCURRENT DATA RESTORE AND BACKGROUND COPY OPERATIONS IN STORAGE NETWORKS

TECHNICAL FIELD

The described subject matter relates to electronic computing, and more particularly to data restore operations in storage networks.

BACKGROUND

The ability to duplicate and store the contents of a storage device is an important feature of a storage system. Data may be stored in parallel to safeguard against the failure of a single storage device or medium. Upon a failure of the first storage device or medium, the system may then retrieve a copy of the data contained in a second storage device or medium. The ability to duplicate and store the contents of the storage device also facilitates the creation of a fixed record of contents at the time of duplication. This feature allows users to recover a prior version of inadvertently edited or erased data.

There are space and processing costs associated with copying and storing the contents of a storage device. For example, some storage devices cannot accept input/output (I/O) operations while its contents are being copied. Furthermore, the storage space used to keep the copy cannot be used for other storage needs.

Storage systems and storage software products can provide ways to make point-in-time copies of disk volumes, sometimes referred to as snapshots. In some of these systems and products, copies may be made quickly, without significantly disturbing applications using disk volumes. In other products, copies may be made space efficient by sharing storage instead of copying all the disk volume data.

Periodically, there may be a need to restore one or more volumes of a storage system to a data state that represents a previous point in time. Users or administrators of storage systems may have varying goals for restore processes. In some instances, restore operations that enable contemporaneous access to data may find utility.

SUMMARY

In an exemplary implementation, a storage device comprises a processor, a memory module communicatively connected to the processor, and logic instructions in the memory module which, when executed by the processor, configure the processor to receive a signal that identifies a source volume and a first target snapshot that represents a point in time copy of the source volume, update metadata to define an restore relationship between the first target snapshot and the source volume, execute a background copy process between the first target snapshot and the source volume, and manage input/output operations during the background copy process to permit input/output operations to the source volume during the background copy process.

BRIEF DESCRIPTION OF THE DRAWINGS

FIGS. 7A-7B are schematic illustration of an exemplary data architecture for implementing snapdifference files in a storage network.

DETAILED DESCRIPTION

Described herein are exemplary storage network architectures, data architectures, and methods for creating and using difference files in storage networks. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Network Architectures

The subject matter described herein may be implemented in a storage architecture that provides virtualized data storage at a system level, such that virtualization is implemented within a SAN. In the implementations described herein, the computing systems that utilize storage are referred to as hosts. In a typical implementation, a host is any computing system that consumes data storage resources capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides storage services for an enterprise.

In a direct-attached storage solution, such a host may include one or more disk controllers or RAID controllers configured to manage multiple directly attached disk drives. By contrast, in a SAN a host connects to the SAN in accordance via a high-speed connection technology such as, e.g., a fibre channel (FC) fabric in the particular examples.

A virtualized SAN architecture comprises a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers may also be coupled to each other through point-to-point connections to enable them to cooperatively manage the presentation of storage capacity to computers using the storage capacity.

The network architectures described herein represent a distributed computing environment such as an enterprise computing system using a private SAN. However, the network architectures may be readily scaled upwardly or downwardly to meet the needs of a particular application.

Figure 1:
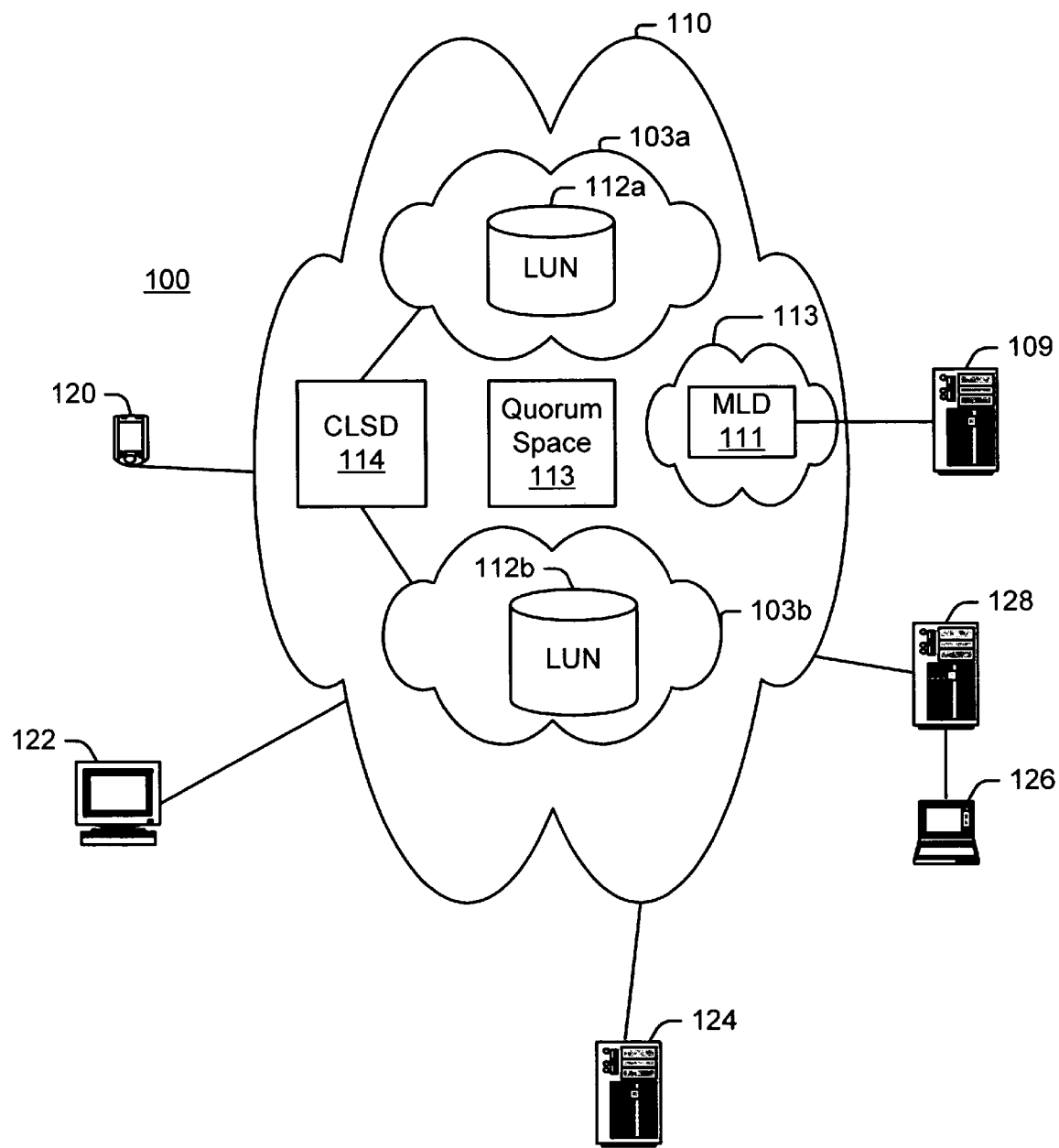
FIG. 1 is a schematic illustration of an exemplary implementation of a networked computing system that utilizes a storage network.

FIG. 1 is a schematic illustration of an exemplary implementation of a networked computing system 100 that utilizes a storage network. In one exemplary implementation, the storage pool 110 may be implemented as a virtualized storage pool as described in published U.S. Patent Application Publication No. 2003/0079102 to Lubbers, et al., the disclosure of which is incorporated herein by reference in its entirety.

A plurality of logical disks (also called logical units or LUNs) 112*a*, 112*b* may be allocated within storage pool 110. Each LUN 112*a*, 112*b* comprises a contiguous range of logical addresses that can be addressed by host devices 120, 122, 124 and 128 by mapping requests from the connection protocol used by the host device to the uniquely identified LUN 112*a*, 112*b*. A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which also may serve as hosts, may logically couple directly to LUNs 112*a*, 112*b*. Hosts 120-128 may couple to multiple LUNs 112*a*, 112*b*, and LUNs 112*a*, 112*b* may be shared among multiple hosts. Each of the devices shown in FIG. 1 may include memory, mass storage, and a degree of data processing capability sufficient to manage a network connection.

A LUN such as LUN 112*a*, 112*b* comprises one or more redundant stores (RStore) which are a fundamental unit of reliable storage. An RStore comprises an ordered set of physical storage segments (PSEGs) with associated redundancy properties and is contained entirely within a single redundant store set (RSS). By analogy to conventional storage systems, PSEGs are analogous to disk drives and each RSS is analogous to a RAID storage set comprising a plurality of drives.

The PSEGs that implements a particular LUN may be spread across any number of physical storage disks. Moreover, the physical storage capacity that a particular LUN 112*a*, 112*b* represents may be configured to implement a variety of storage types offering varying capacity, reliability and availability features. For example, some LUNs may represent striped, mirrored and/or parity-protected storage. Other LUNs may represent storage capacity that is configured without striping, redundancy or parity protection.

In an exemplary implementation an RSS comprises a subset of physical disks in a Logical Device Allocation Domain (LDAD), and may include from six to eleven physical drives (which can change dynamically). The physical drives may be of disparate capacities. Physical drives within an RSS may be assigned indices (e.g., 0, 1, 2, . . . , 11) for mapping purposes, and may be organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS in accordance with the present invention, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to a management logical disk set (MLD) 111 which is a metadata container describing the logical structures used to create LUNs 112*a*, 112*b*, LDADs 103*a*, 103*b*, and other logical structures used by the system. A portion of the physical storage capacity available in storage pool 101 is reserved as quorum space 113 and cannot be allocated to LDADs 103*a*, 103*b*, and hence cannot be used to implement LUNs 112*a*, 112*b*. In a particular example, each physical disk that participates in storage pool 110 has a reserved amount of capacity (e.g., the first "n" physical sectors) that may be designated as quorum space 113. MLD 111 is mirrored in this quorum space of multiple physical drives and so can be accessed even if a drive fails. In a particular example, at least one physical drive is associated with each LDAD 103*a*, 103*b* includes a copy of MLD 111 (designated a "quorum drive"). SAN management appliance 109 may wish to associate information such as name strings for LDADs 103*a*, 103*b* and LUNs 112*a*, 112*b*, and timestamps for object birthdates. To facilitate this behavior, the management agent uses MLD 111 to store this information as metadata. MLD 111 is created implicitly upon creation of each LDAD 103*a*, 103*b*.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103*a*, 103*b*, but that, unlike LUNs 112*a*, 112*b*, may span multiple LDADs 103*a*, 103*b*. Preferably, each LDAD 103*a*, 103*b* includes space allocated to CSLD 114. CSLD 114 holds metadata describing the logical structure of a given LDAD 103*a*, 103*b*, including a primary logical disk metadata container (PLDMC) that contains an array of descriptors (called RSDMs) that describe every RStore used by each LUN 112a, 112b implemented within the LDAD 103a, 103b. The CSLD 114 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure is a directory of all LUNs 112a, 112b in any LDAD 103a, 103b. An entry in the LDDS comprises a universally unique ID (UUID) an RSD indicating the location of a Primary Logical Disk Metadata Container (PLDMC) for that LUN 112a, 112b. The RSD is a pointer to the base RSDM or entry point for the corresponding LUN 112a, 112b. In this manner, metadata specific to a particular LUN 112a, 112b can be accessed by indexing into the LDDIR to find the base RSDM of the particular LUN 112a, 112b. The metadata within the PLDMC (e.g., mapping structures described hereinbelow) can be loaded into memory to realize the particular LUN 112a, 112b.

Hence, the storage pool depicted in FIG. 1 implements multiple forms of metadata that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

In an exemplary implementation an individual LDAD 103a, 103b may correspond to from as few as four disk drives to as many as several thousand disk drives. In particular examples, a minimum of eight drives per LDAD is required to support RAID-1 within the LDAD 103a, 103b using four paired disks. LUNs 112a, 112b defined within an LDAD 103a, 103b may represent a few megabytes of storage or less, up to 2TByte of storage or more. Hence, hundreds or thousands of LUNs 112a, 112b may be defined within a given LDAD 103a, 103b, and thus serve a large number of storage needs. In this manner a large enterprise can be served by a single storage pool 110 providing both individual storage dedicated to each workstation in the enterprise as well as shared storage across the enterprise. Further, an enterprise may implement multiple LDADs 103a, 103b and/or multiple storage pools 1101 to provide a virtually limitless storage capability. Logically, therefore, the virtual storage system in accordance with the present description offers great flexibility in configuration and access.

Figure 2:
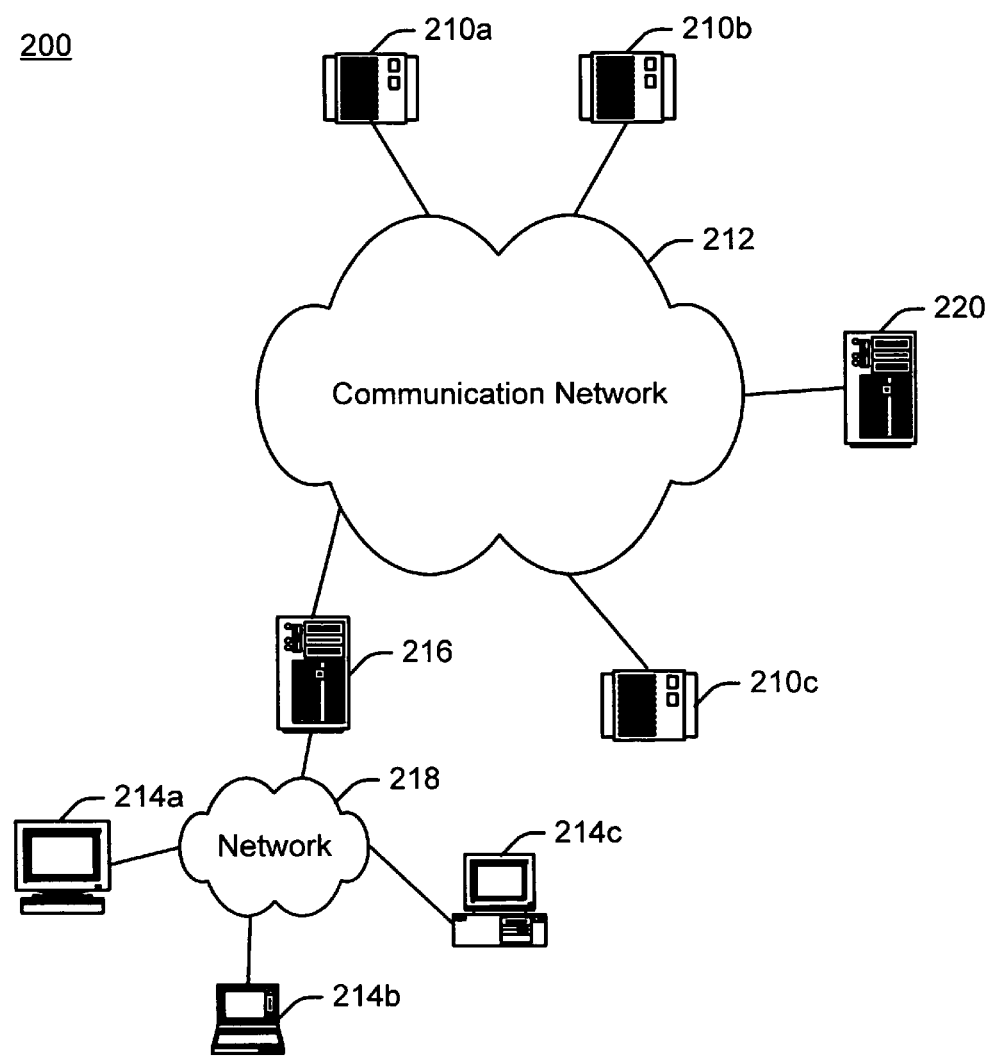
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available form Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. By way of example, a switching fabric comprising a single FC switch can interconnect 256 or more ports, providing a possibility of hundreds of storage cells 210a, 210b, 210c in a single storage network.

Figure 3:
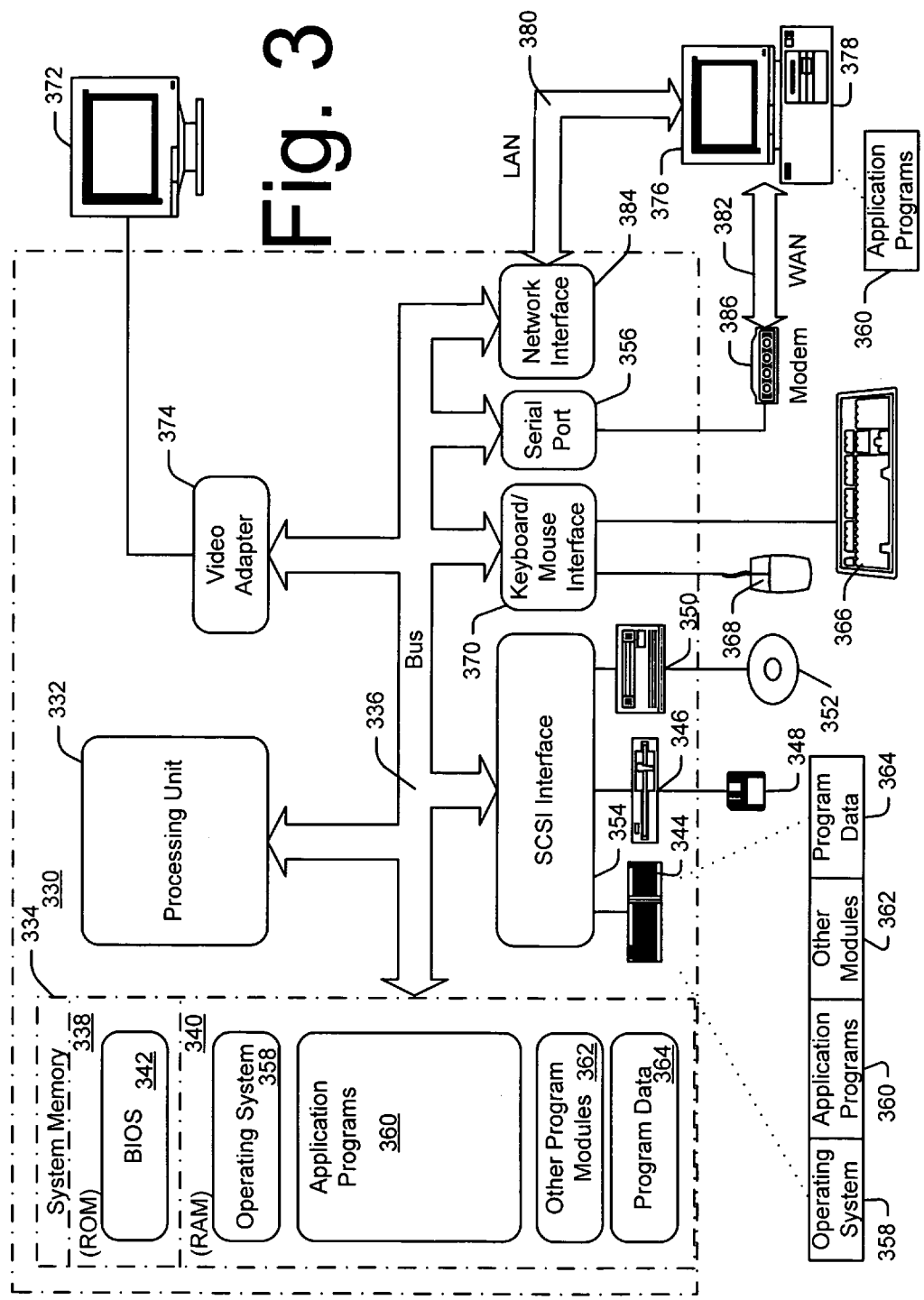
FIG. 3 is a schematic illustration of an exemplary implementation of a computing device that can be utilized to implement a host.

Hosts 216, 220 are typically implemented as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 4:
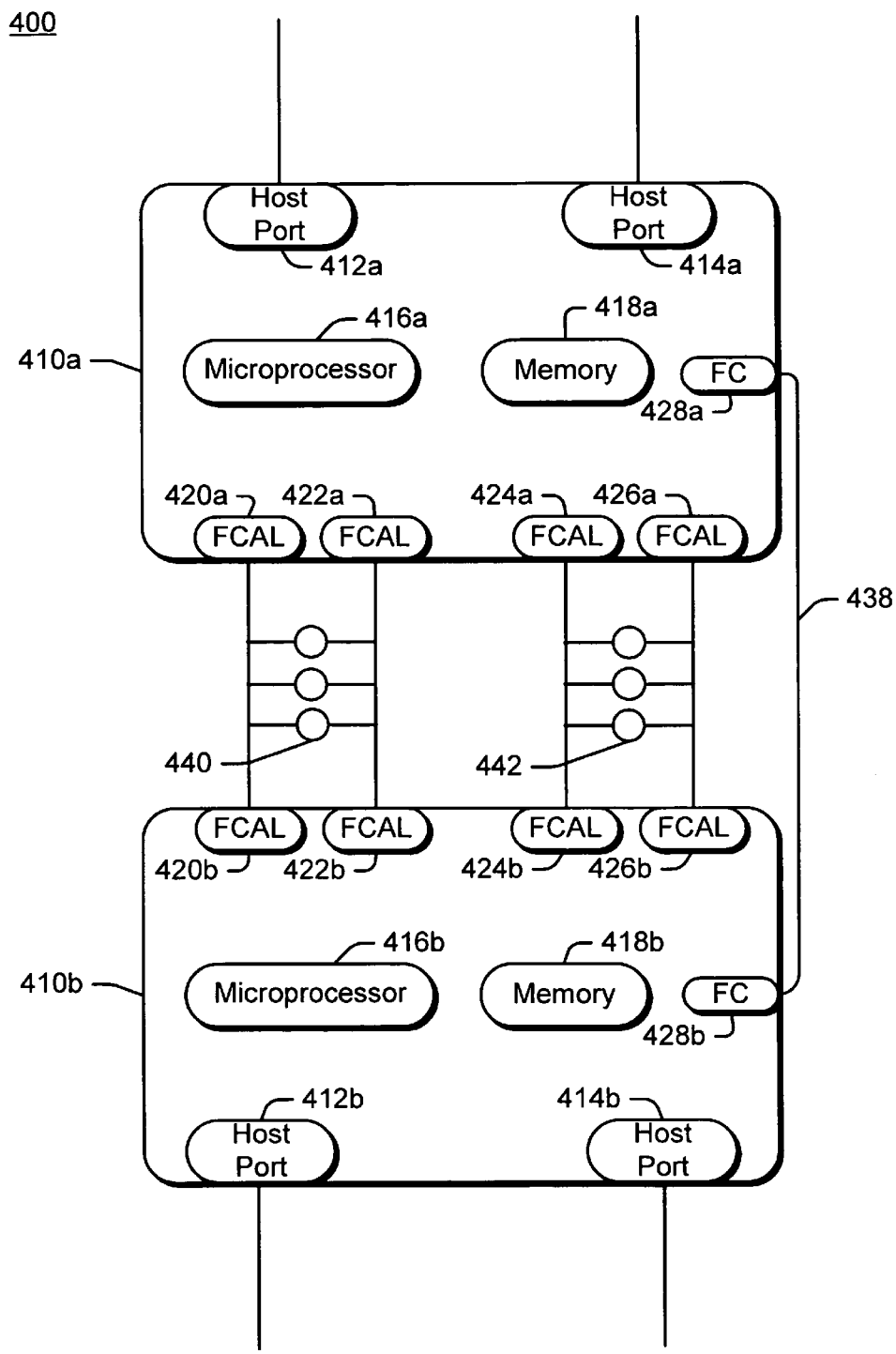
FIG. 4 is a schematic illustration of an exemplary implementation of a storage cell.

FIG. 4 is a schematic illustration of an exemplary implementation of a storage cell 400 that may be used to implement a storage cell such as 210a, 210b, or 210c. Referring to FIG. 4, storage cell 400 includes two Network Storage Controllers (NSCs), also referred to as disk array controllers, 410a, 410b to manage the operations and the transfer of data to and from one or more disk drives 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric or a small computer serial interface (SCSI) connection may be used.

In operation, the storage capacity provided by the arrays of disk drives 440, 442 may be added to the storage pool 110. When an application requires storage capacity, logic instructions on a host computer 128 establish a LUN from storage capacity available on the arrays of disk drives 440, 442 available in one or more storage sites. It will be appreciated that, because a LUN is a logical unit, not necessarily a physical unit, the physical storage space that constitutes the LUN may be distributed across multiple storage cells. Data for the application is stored on one or more LUNs in the storage network. An application that needs to access the data queries a host computer, which retrieves the data from the LUN and forwards the data to the application.

One or more of the storage cells 210a, 210b, 210c in the storage network 200 may implement RAID-based storage. RAID (Redundant Array of Independent Disks) storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures all involve parity-type redundant storage. Of particular interest, a RAID 5 system distributes data and parity information across a plurality of the disks. Typically, the disks are divided into equally sized address areas referred to as "blocks". A set of blocks from each disk that have the same unit address ranges are referred to as "stripes". In RAID 5, each stripe has N blocks of data and one parity block, which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they compute and place the parity block on the disks. The particular RAID class implemented is not important.

Figure 5:
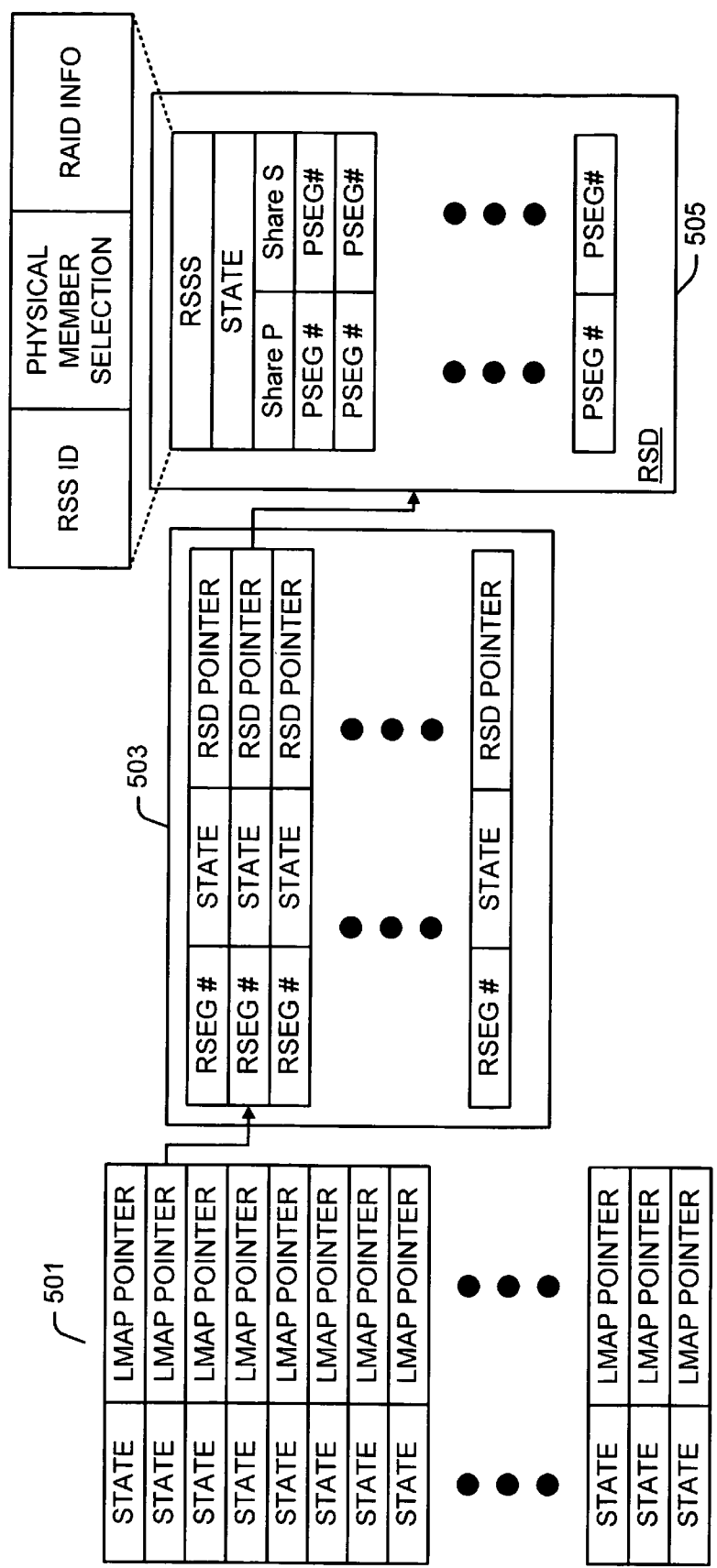
FIG. 5 illustrates an exemplary memory representation of a LUN.

FIG. 5 illustrates an exemplary memory representation of a LUN 112a, 112b in one exemplary implementation. A memory representation is essentially a mapping structure that is implemented in memory of a NSC 410a, 410b that enables translation of a request expressed in terms of a logical block address (LBA) from host such as host 128 depicted in FIG. 1 into a read/write command addressed to a particular portion of a physical disk drive such as disk drive 440, 442. A memory representation desirably is small enough to fit into a reasonable amount of memory so that it can be readily accessed in operation with minimal or no requirement to page the memory representation into and out of the NSC's memory.

The memory representation described herein enables each LUN 112a, 112b to implement from 1 Mbyte to 2 TByte in storage capacity. Larger storage capacities per LUN 112a, 112b are contemplated. For purposes of illustration a 2Terabyte maximum is used in this description. Further, the memory representation enables each LUN 112a, 112b to be defined with any type of RAID data protection, including multi-level RAID protection, as well as supporting no redundancy at all. Moreover, multiple types of RAID data protection may be implemented within a single LUN 112a, 112b such that a first range of logical disk addresses (LDAs) correspond to unprotected data, and a second set of LDAs within the same LUN 112a, 112b implement RAID 5 protection. Hence, the data structures implementing the memory representation must be flexible to handle this variety, yet efficient such that LUNs 112a, 112b do not require excessive data structures.

A persistent copy of the memory representation shown in FIG. 5 is maintained in the PLDMDC for each LUN 112a, 112b described hereinbefore. The memory representation of a particular LUN 112a, 112b is realized when the system reads metadata contained in the quorum space 113 to obtain a pointer to the corresponding PLDMDC, then retrieves the PLDMDC and loads an level 2 map (L2MAP) 501. This is performed for every LUN 112a, 112b, although in ordinary operation this would occur once when a LUN 112a, 112b was created, after which the memory representation will live in memory as it is used.

A logical disk mapping layer maps a LDA specified in a request to a specific RStore as well as an offset within the RStore. Referring to the embodiment shown in FIG. 5, a LUN may be implemented using an L2MAP 501, an LMAP 503, and a redundancy set descriptor (RSD) 505 as the primary structures for mapping a logical disk address to physical storage location(s) represented by an address. The mapping structures shown in FIG. 5 are implemented for each LUN 112a, 112b. A single L2MAP handles the entire LUN 112a, 112b. Each LUN 112a, 112b is represented by multiple LMAPs 503 where the particular number of LMAPs 503 depend on the actual address space that is allocated at any given time. RSDs 505 also exist only for allocated storage space. Using this split directory approach, a large storage volume that is sparsely populated with allocated storage, the structure shown in FIG. 5 efficiently represents the allocated storage while minimizing data structures for unallocated storage.

L2MAP 501 includes a plurality of entries where each entry represents 2 Gbyte of address space. For a 2 Tbyte LUN 112a, 112b, therefore, L2MAP 501 includes 1024 entries to cover the entire address space in the particular example. Each entry may include state information corresponding to the corresponding 2 Gbyte of storage, and a pointer a corresponding LMAP descriptor 503. The state information and pointer are only valid when the corresponding 2 Gbyte of address space have been allocated, hence, some entries in L2MAP 501 will be empty or invalid in many applications.

The address range represented by each entry in LMAP 503, is referred to as the logical disk address allocation unit (LDAAU). In the particular implementation, the LDAAU is 8 MByte. An entry is created in LMAP 503 for each allocated LDAAU irrespective of the actual utilization of storage within the LDAAU. In other words, a LUN 112a, 112b can grow or shrink in size in increments of 1 Mbyte. The LDAAU is represents the granularity with which address space within a LUN 112a, 112b can be allocated to a particular storage task.

An LMAP 503 exists only for each 2 Gbyte increment of allocated address space. If less than 2 Gbyte of storage are used in a particular LUN 112a, 112b, only one LMAP 503 is required, whereas, if 2 Tbyte of storage is used, 1024 LMAPs 503 will exist. Each LMAP 503 includes a plurality of entries where each entry optionally corresponds to a redundancy segment (RSEG). An RSEG is an atomic logical unit that is roughly analogous to a PSEG in the physical domain—akin to a logical disk partition of an RStore. In a particular embodiment, an RSEG is a logical unit of storage that spans multiple PSEGs and implements a selected type of data protection. Entire RSEGs within an RStore are bound to contiguous LDAs in a preferred implementation. In order to preserve the underlying physical disk performance for sequential transfers, it is desirable to adjacently locate all RSEGs from an RStore in order, in terms of LDA space, so as to maintain physical contiguity. If, however, physical resources become scarce, it may be necessary to spread RSEGs from RStores across disjoint areas of a LUN 112a, 112b. The logical disk address specified in a request selects a particular entry within LMAP 503 corresponding to a particular RSEG that in turn corresponds to 1 Mbyte address space allocated to the particular RSEG#. Each LMAP entry also includes state information about the particular RSEC; and an RSD pointer.

Optionally, the RSEG#s may be omitted, which results in the RStore itself being the smallest atomic logical unit that can be allocated. Omission of the RSEG# decreases the size of the LMAP entries and allows the memory representation of a LUN 112a, 112b to demand fewer memory resources per MByte of storage. Alternatively, the RSEG size can be increased, rather than omitting the concept of RSEGs altogether, which also decreases demand for memory resources at the expense of decreased granularity of the atomic logical unit of storage. The RSEG size in proportion to the RStore can, therefore, be changed to meet the needs of a particular application.

The RSD pointer points to a specific RSD 505 that contains metadata describing the RStore in which the corresponding RSEG exists. As shown in FIG. 5, the RSD includes a redundancy storage set selector (RSSS) that includes a redundancy storage set (RSS) identification, a physical member selection, and RAID information. The physical member selection is essentially a list of the physical drives used by the RStore. The RAID information, or more generically data protection information, describes the type of data protection, if any, that is implemented in the particular RStore.

RSD 505 further includes two fields for bits referred to as share bits, a predecessor share bit referred to as Share P ($S_p$) and a successor share bit referred to as Share S ($S_s$) If the data in the RSD is shared with a predecessor snapshot, then the predecessor share bit may be set to a first logical value (e.g., a binary 1). By contrast, if the data in the RSD is not shared with a predecessor snapshot, then the predecessor share bit may be set to a second logical value (e.g. a binary zero). Similarly, if the data in the RSD is shared with a successor snapshot, then the successor share bit may be set to a first logical value (e.g., a binary 1. By contrast, if the data in the RSD is not shared with a successor snapshot, then the predecessor share bit may be set to a second logical value (e.g. a binary zero).

Each RSD also includes a number of fields that identify particular PSEG numbers within the drives of the physical member selection that physically implement the corresponding storage capacity. Each listed PSEG# corresponds to one of the listed members in the physical member selection list of the RSSS. Any number of PSEGs may be included, however, in a particular embodiment each RSEG is implemented with between four and eight PSEGs, dictated by the RAID type implemented by the RStore.

In operation, each request for storage access specifies a LUN 112a, 112b, and an address. A NSC such as NSC 410a, 410b maps the logical drive specified to a particular LUN 112a, 112b, then loads the L2MAP 501 for that LUN 112a, 112b into memory if it is not already present in memory. Preferably, all of the LMAPs and RSDs for the LUN 112a, 112b are loaded into memory as well. The LDA specified by the request is used to index into L2MAP 501, which in turn points to a specific one of the LMAPs. The address specified in the request is used to determine an offset into the specified LMAP such that a specific RSEG that corresponds to the request-specified address is returned. Once the RSEG# is known, the corresponding RSD is examined to identify specific PSEGs that are members of the redundancy segment, and metadata that enables a NSC 410a, 410b to generate drive specific commands to access the requested data. In this manner, an LDA is readily mapped to a set of PSEGs that must be accessed to implement a given storage request.

The L2MAP consumes 4 Kbytes per LUN 112a, 112b regardless of size in an exemplary implementation. In other words, the L2MAP includes entries covering the entire 2 Tbyte maximum address range even where only a fraction of that range is actually allocated to a LUN 112a, 112b. It is contemplated that variable size L2MAPs may be used, however such an implementation would add complexity with little savings in memory. LMAP segments consume 4 bytes per Mbyte of address space while RSDs consume 32 bytes per MB. Unlike the L2MAP, LMAP segments and RSDs exist only for allocated address space.

Figure 6:
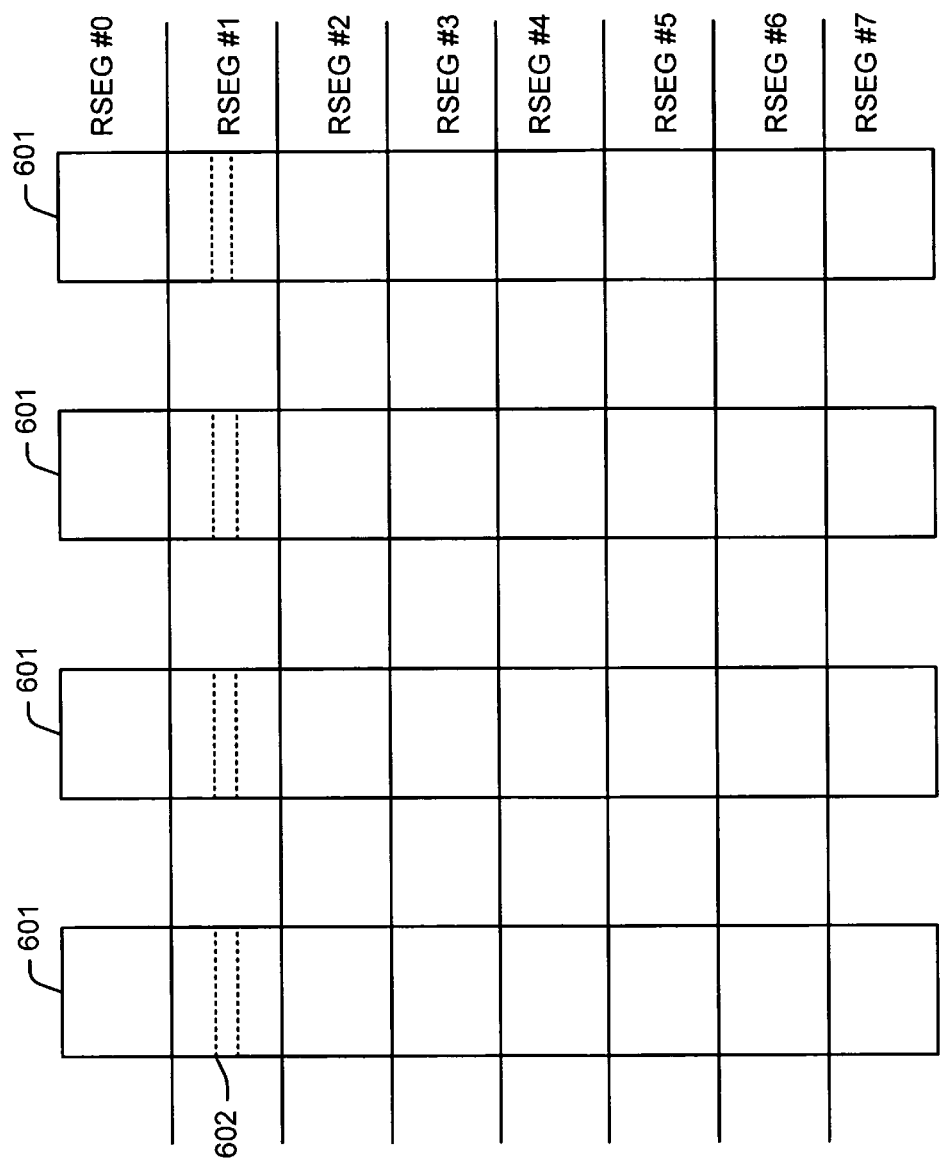
FIG. 6 is a schematic illustration of data allocation in a virtualized storage system.

FIG. 6 is a schematic illustration of data allocation in a virtualized storage system. Referring to FIG. 6, a redundancy layer selects PSEGs 601 based on the desired protection and subject to NSC data organization rules, and assembles them to create Redundant Stores (RStores). The set of PSEGs that correspond to a particular redundant storage set are referred to as an "RStore". Data protection rules may require that the PSEGs within an RStore are located on separate disk drives, or within separate enclosure, or at different geographic locations. Basic RAID-5 rules, for example, assume that striped data involves striping across independent drives. However, since each drive comprises multiple PSEGs, the redundancy layer of the present invention ensures that the PSEGs are selected from drives that satisfy desired data protection criteria, as well as data availability and performance criteria.

RStores are allocated in their entirety to a specific LUN 112a, 112b. RStores may be partitioned into 1 Mbyte segments (RSEGs) as shown in FIG. 6. Each RSEG in FIG. 6 presents only 80% of the physical disk capacity consumed as a result of storing a chunk of parity data in accordance with RAID 5 rules. When configured as a RAID 5 storage set, each RStore will comprise data on four PSEGs, and parity information on a fifth PSEG (not shown) similar to RAID4 storage. The fifth PSEG does not contribute to the overall storage capacity of the RStore, which appears to have four PSEGs from a capacity standpoint. Across multiple RStores the parity will fall on various of various drives so that RAID 5 protection is provided.

RStores are essentially a fixed quantity (8 MByte in the examples) of virtual address space. RStores consume from four to eight PSEGs in their entirety depending on the data protection level. A striped RStore without redundancy consumes 4 PSEGs (4-2048 KByte PSEGs=8 MB), an RStore with 4+1 parity consumes 5 PSEGs and a mirrored RStore consumes eight PSEGs to implement the 8 Mbyte of virtual address space.

An RStore is analogous to a RAID disk set, differing in that it comprises PSEGs rather than physical disks. An RStore is smaller than conventional RAID storage volumes, and so a given LUN 112a, 112b will comprise multiple RStores as opposed to a single RAID storage volume in conventional systems.

It is contemplated that drives 440, 442 may be added and removed from an LDAD 103a, 103b over time. Adding drives means existing data can be spread out over more drives while removing drives means that existing data must be migrated from the exiting drive to fill capacity on the remaining drives. This migration of data is referred to generally as "leveling". Leveling attempts to spread data for a given LUN 112a, 112b over as many physical drives as possible. The basic purpose of leveling is to distribute the physical allocation of storage represented by each LUN 112a, 112b such that the usage for a given logical disk on a given physical disk is proportional to the contribution of that physical volume to the total amount of physical storage available for allocation to a given logical disk.

Existing RStores can be modified to use the new PSEGs by copying data from one PSEG to another and then changing the data in the appropriate RSD to indicate the new membership. Subsequent RStores that are created in the RSS will use the new members automatically. Similarly, PSEGs can be removed by copying data from populated PSEGs to empty PSEGs and changing the data in LMAP 502 to reflect the new PSEG constituents of the RSD. In this manner, the relationship between physical storage and logical presentation of the storage can be continuously managed and updated to reflect current storage environment in a manner that is invisible to users.

Instant Restore Operations

A data storage system may be configured to implement an instant restore of a data set from one or more point-in-time copies (either snapshots or mirror clones) referred to herein as snapshot(s). As used herein, the term "instant restore" refers to a restore operation in which a source volume is restored to a previous point-in-time using a snapshot, and in which the data is available for access contemporaneously. In one embodiment, referred to herein as a "high performance" mode instant restore, an instant restore operation may invalidate one or more newer snapshots to increase the speed of the restore operation. In another embodiment, referred to herein as a "normal mode" instant restore, the restore operation maintains data integrity of newer snapshots during the restore operation. In another embodiment, instant restore operations may be implemented in an environment that includes a mirror clone of a source volume.

FIG. 7A is a schematic high-level illustration of a data storage architecture in accordance with one embodiment. Referring to FIG. 7A, in one embodiment a source volume 710, which may also be referred to as a source virtual disk (Vdisk), may be embodied as a logical unit (LU) or a logical disk (LD) that includes production data for one or more applications. One or more snapshots 712, 714, 716 include a point-in-time representation of source volume 710.

In one embodiment, snapshots 712, 714, 716 may be logically linked, e.g., by pointers in one or more memory structures. In the embodiment depicted in FIG. 7A, snapshot 1 712 represents a snapshot of the data taken at a first point in time, and snapshot 2 714 represents a snapshot taken at a second point in time, later than the first point in time. Snapshots may be linked in a serial fashion. Hence, snapshot n 716 represents the most recent point in time copy of source volume 710. In theory, there is no limit to the number of snapshots that may be created of a source volume 710.

In one embodiment, referred to herein as a "space inefficient" snapshot, one or more of snapshots 712, 714, 716 may reserve the space on one or more physical drives necessary to hold a copy of the data in source volume 710. In an alternate embodiment, referred to herein as a "space efficient" snapshot, one or more of snapshots 712, 714, 716 does not reserve space on one or more physical drives to hold a copy of the data in source volume 710. Rather, physical storage space for the snapshot 712, 714, 716 is allocated on demand as the data is written into the snapshot. A space efficient snapshot consumes less storage space than a space-inefficient snapshot, but creates a possibility of reaching an overcommit state, in which the physical storage lacks sufficient storage capacity to hold the snapshot.

FIG. 7B is a schematic high-level illustration of a data storage architecture in accordance with another embodiment. Referring to FIG. 7B, in one embodiment a source volume 720 may have a mirrored clone 730 that includes a complete copy of the data in source volume 720 or a point in time complete copy of the data in source volume 720. One or more snapshots 732, 734, 736 may be taken of mirrored clone 730. In one embodiment, mirror clone 730 may reside in a different LDAD from the source volume 720. This permits the mirror clone data to reside on a different set of disks from the source volume, which provides performance and fault tolerance benefits.

Figure 8:
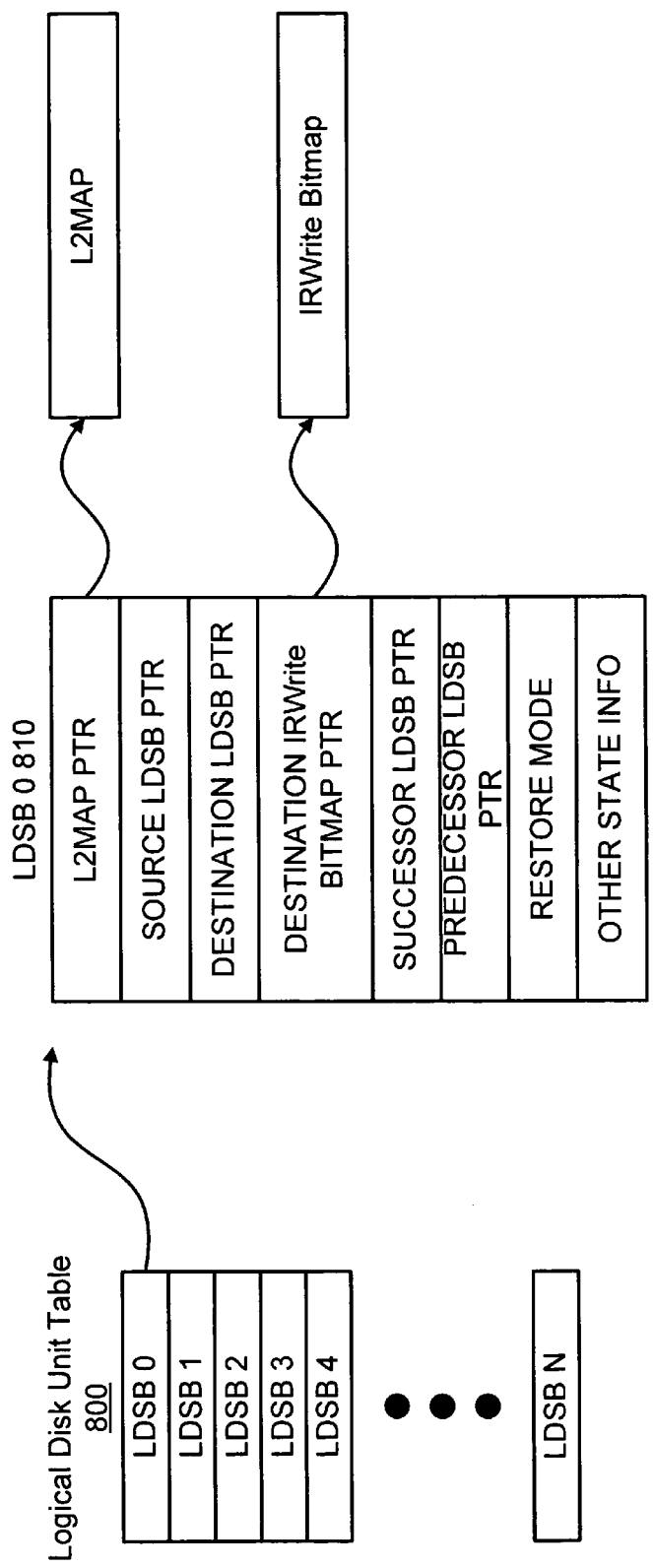
FIG. 8 is a schematic illustration of an exemplary file structure for creating and using snapdifference files in a storage network.

Aspects of data mapping associated with instant restore operations will be explained in greater detail with reference to FIG. 8, which is a schematic illustration of memory maps for logical volumes such as, e.g., a source volume 710, mirror clone 730, or one or more snapshot files such as the snapshot files 712, 714, 716, depicted in FIG. 7. Referring briefly to FIG. 8, in one implementation a memory mapping for instant restore operations begins in a logical disk unit table 800, which includes an array of data structures that maps a plurality of logical disk state blocks (LDSBs), which may be numbered sequentially, i.e., LDSB1 ... LDSB N. In one embodiment, the LDSBs may include a memory mapping for a source volume such as e.g., source volume 710, 720, a snapshot such as snapshot 712, 714, 716, or for a mirrored clone such as e.g., mirrored clone 730 or it's snapshots 732, 734, 736.

In one embodiment, an LDSB includes an L2MAP 501 pointer, which points to an L2MAP 501 mapping data structure, which, as described above, ultimately maps to a PSEG (or to a disk in a non-virtualized system). LDSB 810 may further include a SOURCE LDSB pointer field that may include a pointer to a snapshot that represents the source of a restore operation, a DESTINATION LDSB pointer field that may include a pointer to the source volume that is the target of the restore operation, a destination IRWrite bitmap pointer that may include a pointer to an IRWrite bitmap, a successor LDSB pointer field that may include a pointer to a successor LDSB, and a predecessor LDSB pointer field that may include a pointer to a predecessor LDSB. LDSB may further include a restore mode field that may include a flag which indicates whether the instant restore operation is to be executed in a high performance mode or in a normal mode, and one or more data fields that includes other state information. LDSBs 1 through N may include similar fields and mappings.

LDSB 810 further includes a data field referred to herein as DESTINATION IRWrite BITMAP PTR. The IRWrite field is used as an indicator of whether the RSEG with which the RSD is associated has been affected by a host write I/O operation or a background copy operation during the course of an instant restore operation. In brief, the IRWrite field is set to a first logical value during a setup process to prepare for an instant restore operation. If, during the instant restore operation, a write I/O operation affects the RSEC, then the IRWrite field is changed to a second logical value, different than the first logical value. Similarly, if a background copy process executed during the instant restore operation affects the RSEQ then the IRWrite field is changed to a second logical value, different from the first logical value.

Thus, when the IRWrite bit is set for the source volume, it indicates that the data has already been restored to the source volume. No further operations need to be done to maintain data integrity of other snapshots in a snaptree and a host write can just write to the source volume. In addition, a set IRWrite indicates that a background copy operation may skip this RSEG since it has already been restored. The IRWrite bit permits host writes, reads and the background copy to happen concurrently and to be interleaved.

FIGS. 9-13 are flow diagrams illustration operations in methods for instant restore operations. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on a processor or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 9:
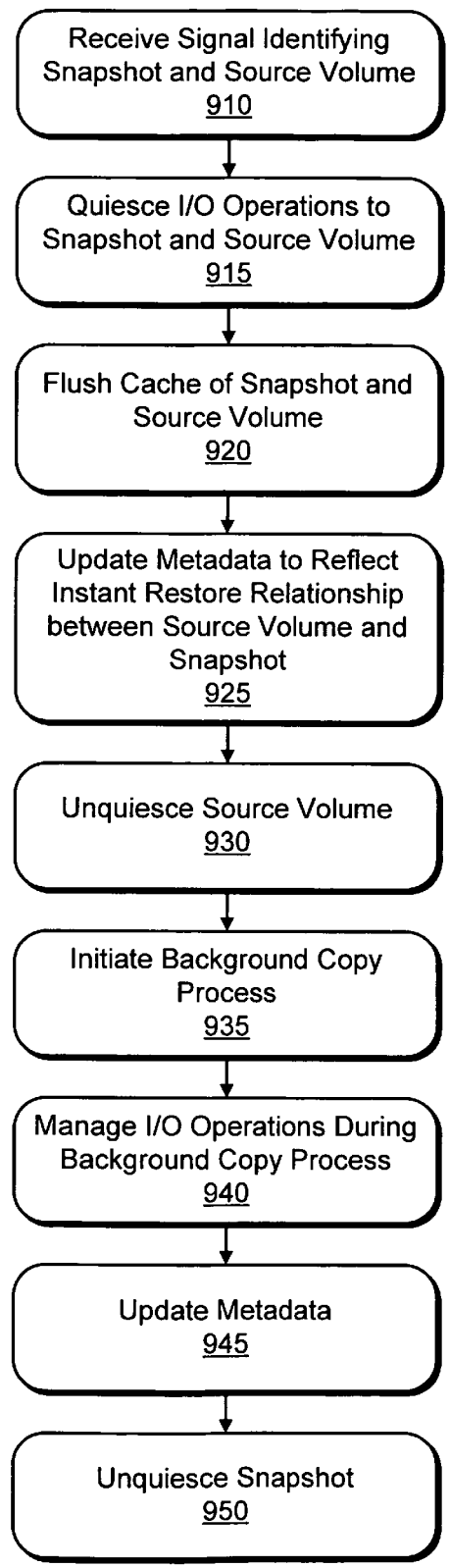
FIG. 9 is a flowchart illustrating operations in a method for data restore operations in a storage network in accordance with an embodiment.

FIG. 9 is a flowchart illustrating operations in a method for data restore operations in a storage network in accordance with an embodiment. Referring to FIG. 9, at operation 910 a signal that identifies a source (i.e., a snapshot or mirror clone) to use in restoring a destination (i.e., a source volume) is received. In one embodiment the signal may be received from a user interface. At operation 915 input/output (I/O) operations to the snapshot cache and the cache of the source volume are quiesced. At operation 920 the cache of the snapshot and the source volume are flushed to disk 440, 442.

At operation 925 metadata associated with the snapshot is updated to reflect the instant restore relationship between the source volume and the snapshot. As described above in connection with FIG. 8, in one embodiment two pointers are added to the LDSB of logical volumes. At operation 925, these pointers are set. In one embodiment, establishing an instant restore relationship may include initializing the LDSB of the source volume with the mode of the instant restore operation (high-performance or normal), the IRWrite bits to a first logical value, and initializing the source and destination pointers in the LDSB. In addition, corresponding metadata that is stored in a non-volatile medium (i.e., on disk in a part of the PLDMC), may be updated.

At operation 930 the source volume is unquiesced, which permits I/O operations to be directed to the source volume. At operation 935 a background copy process is initiated between the snapshot and the source volume. The background copy process may generate appropriate signaling with one or more host computers that initiated the process. At operation 940 input/output (I/O) operations directed to the source volume and/or the snapshot are managed to provide data integrity to the source volume and snapshot. At operation 945 when the background copy completes, metadata is updated to sever the instant restore relationship between the snapshot and source volume. At operation 950 the snapshot is unquiesced and I/O operations to it are allowed. In normal mode I/O operations are managed to maintain data integrity to all newer and older snapshots as well. All restores in snaptrees that contain a mirror clone (regardless of mode) are processed in normal mode and data integrity of the mirror clone and all snapshots in the snaptree is maintained. Various aspects of FIG. 9 will be explained in greater detail below.

Figure 10:
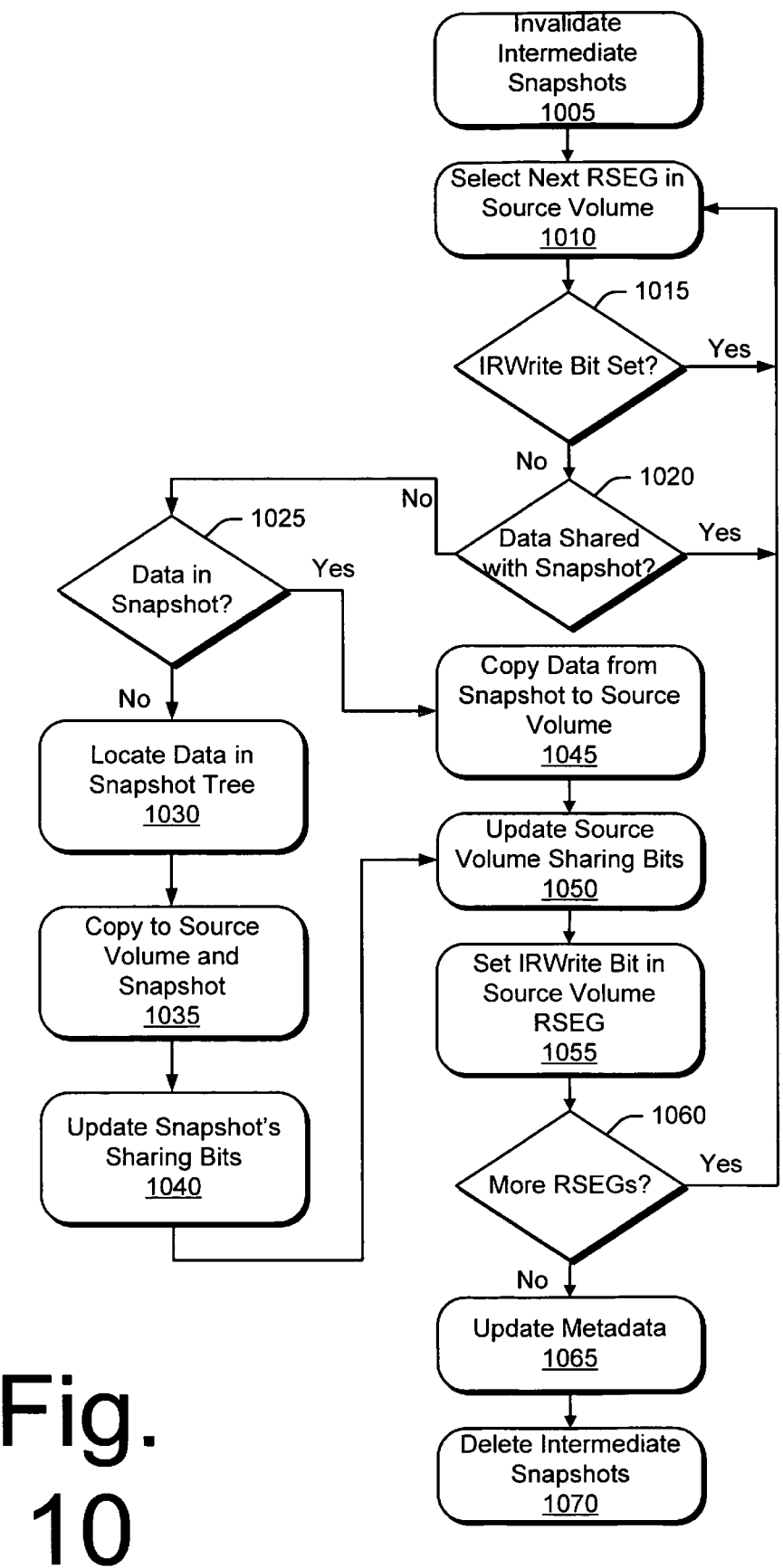
FIG. 10 is a flowchart illustrating operations in a background copy process in a storage network in accordance with an embodiment.
Figure 11:
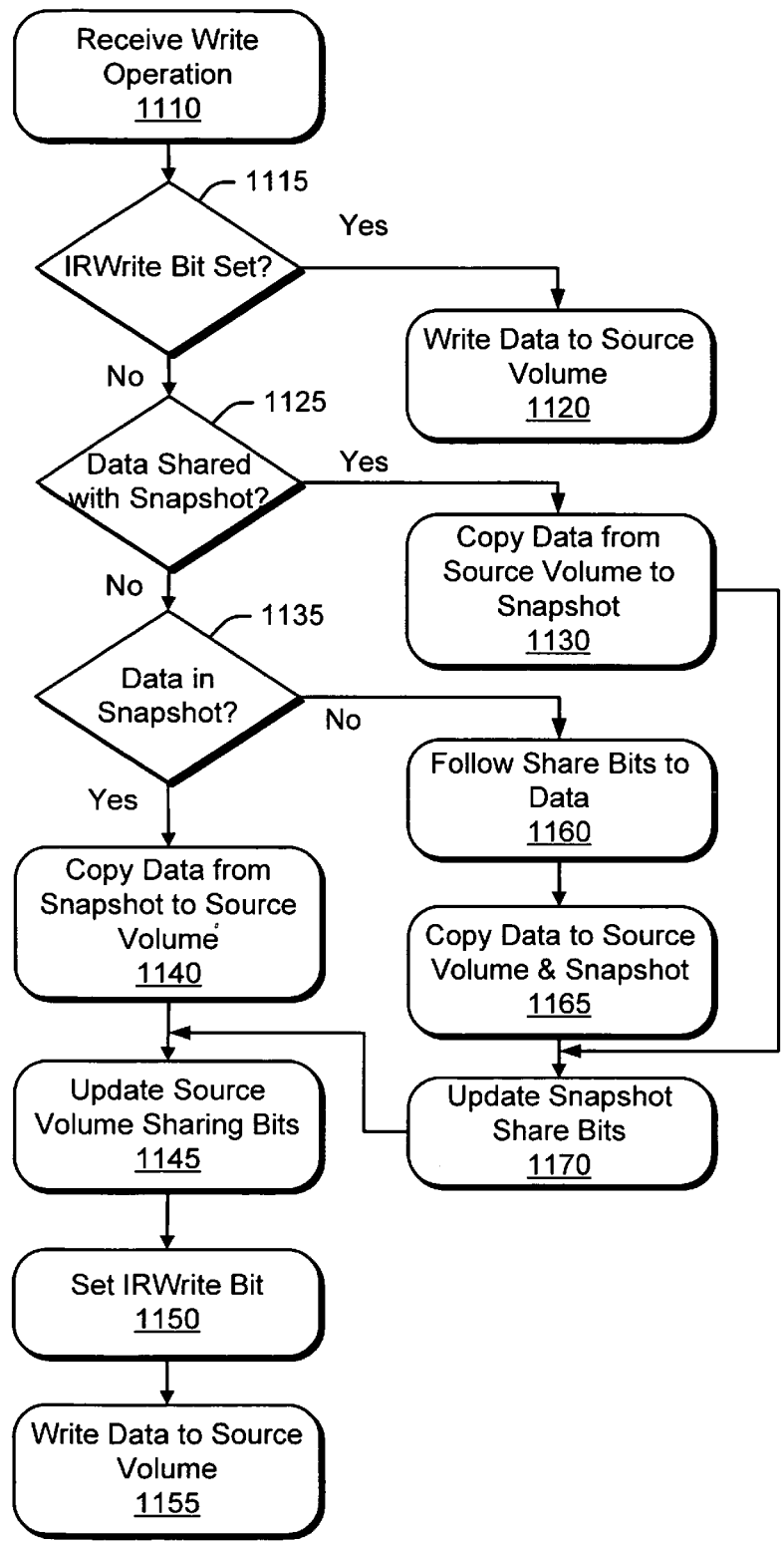
FIG. 11 is a flowchart illustrating operations in a method for managing write operations during a background copy process in accordance with an embodiment.
Figure 12:
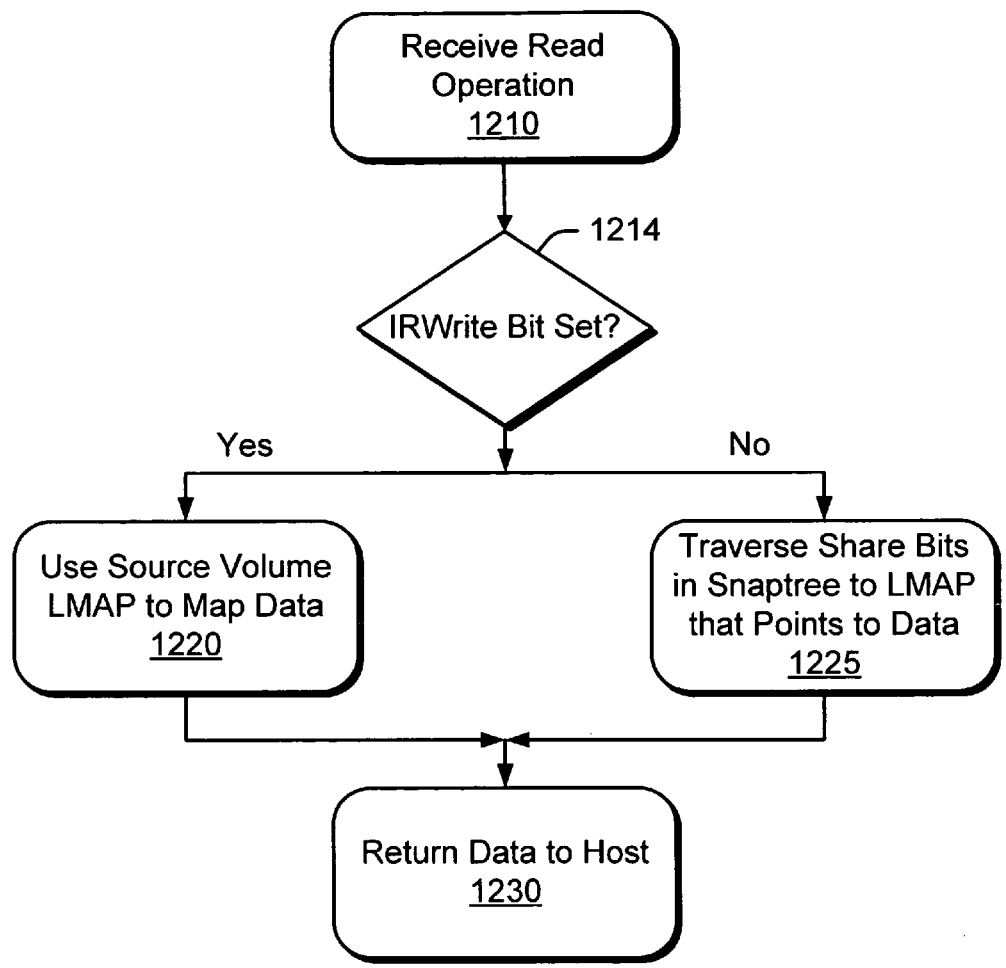
FIG. 12 is a flowchart illustrating operations in a method for managing read operations during a background copy process in accordance with an embodiment.

In one embodiment, a data restore operation may be implemented in a high-performance mode, in which data consistency need not maintained in snapshots between the selected snapshot and the source volume. FIGS. 10-12 illustrate operations in a high-performance mode data restore operation. FIG. 10 is a flowchart illustrating operations in a background copy process in a storage network in accordance with an embodiment. The operations described in FIG. 10 may be implemented as a component of the background copy process of operation 935 of FIG. 9. In one embodiment, the background copy process traverses the memory map of the selected source volume and copies data from the snapshot selected as a point-in-time copy from which a source volume is to be restored. In one embodiment, only data that differs between the source volume and snapshot is copied.

Referring to FIG. 10, at operation 1005 intermediate snapshots (i.e., snapshots between the snapshot selected for the restore operation and the source volume) are set to invalid. Hence, these intermediate snapshots are no longer read from or written to, as host writes and background copy operations will make their data inconsistent with the point in time at which they were created. At operation 1010 the next RSEG in the source volume is selected. In the initial iteration, the "next" RSEG will correspond to the first RSEG in the source volume. If, at operation 1015, the IRWrite bit is set to a value that indicates that the RSEG on the source volume has been written by the host during a background copy process, then control passes back to operation 1010 and the next RSEG in the source volume is selected. The particular value to which the IRWrite bit is set to indicate whether the host is not critical. In one embodiment, the IRWrite bit may be set to a logic one (1) to indicate that the RSEG on the source volume has been written by the host.

By contrast, if at operation 1015 the IRWrite bit is not set, then control passes to operation 1020. If, at operation 1020, the data in the RSEG is shared with the snapshot selected for the restore operation, then control passes back to operation 1010. In one embodiment, determining whether the data in the RSEG is shared with the snapshot may include checking the value of the share bit in the RSD and traversing successor links in the LDSB until reaching the source volume or finding the RSEG is shared with another snapshot (see FIG. 5).

By contrast, if at operation 1020 data in the RSEG is not shared with the snapshot selected for the restore operation, then control passes to operation 1025. If, at operation 1025, there is data in the snapshot, then control passes to operation 1045 and the data is copied from the snapshot selected for the restore operation to the source volume.

If, at operation 1025, no data resides in the RSEG of the snapshot selected for the restore operation, then control passes to operation 1030 and the data is located in the snapshot tree. In one embodiment, locating the data in the snapshot tree may include checking the value of the share bit in the RSD and traversing the successor links in the LDSB to find the snapshot in which data is located. Once the data is located the data is copied to the source volume and the snapshot selected for the restore operation (operation 1035).

At operation 1040 the sharing bits of the snapshot selected for the restore operation are updated to reflect that the RSEG in the snapshot no longer shares data with a successor. The snapshot successor's predecessor sharing bit ($S_p$) is also updated to indicate no sharing with the snapshot. At operation 1050 the sharing bits of the source volume are updated to reflect that the source volume no longer shares bits with a predecessor. The predecessor's successor sharing bit ($S_s$) is also cleared. At operation 1055 the IRWrite bit in the source volume is set. In one embodiment, the IRWrite bit is set to a value that indicates that the data in the RSEG has been restored to the source volume.

If at operation 1060 there are more RSEGs in the source volume, then control passes back to operation 1010 and the next RSEG in the source volume is selected. Thus, operations 1010-1060 for a loop which, when executed, traverses the RSEGS of a source volume and restores the RSEGs to the point-in-time state of the snapshot selected for use in the restore process.

If, at operation 1060 there are no further RSEGS in the source volume, then control passes to operation 1065 and metadata is updated to reflect that there is no longer an instant restore operation between the source volume and the snapshot. In one embodiment, updating the metadata may include updating the IRWrite pointers, SOURCE, DESTINATION and RESTORE MODE in the source volume LDSB and the snapshot LDSB (FIG. 8) to indicate that the instant restore relationship no longer exists. At 1070 all snapshots between the snapshot that was the source of the restore and the source volume are deleted. Deletion of these intermediate snapshots does not require any further unsharing or data copying because all the data that needed to be copied was copied to the source volume and snapshot that was the source of the restore in operation 1035.

FIG. 11 is a flowchart illustrating operations in a method for managing write operations during a background copy process in accordance with an embodiment. The operations described in FIG. 11 may be implemented as a component of the background copy process of operation 940 of FIG. 9. Referring to FIG. 11, at operation 1110 a write operation is received in a controller that manages operations of the source volume and one or more snapshots. In one embodiment, the write operation may be received from a host computer and may identify one or more RSEGS which are to be written.

If, at operation 1115 the IRWrite bit is set for the RSEG(s) identified in the write operation, then control passes to operation 1120 and the data associated with the write operation is written to the source volume. By contrast, if at operation 1115 the IRWrite bit is not set to a value that indicates that the RSEG on the source volume has been written by the host, then control passes to operation 1125.

If, at operation 1125 the data in the RSEG(s) identified in the write operation is shared with the snapshot that is the source of the restore, then control passes to operation 1130 and the data is copied from the source volume RSEG to the snapshot. Control then passes to operation 1170 and the share bits in the snapshot selected for the restore operation are updated to reflect that the snapshot no longer shares data with a successor snapshot. The snapshot successor's share bits are also updated to reflect that it no longer shares with its predecessor. Control then passes to operation 1145 and the share bits in the source volume are updated to reflect that the source volume no longer shares data with a predecessor snapshot. At operation 1150 the IRWrite bit in the source volume is set to a value that indicates that data in the source disk has been restored (i.e., that data in the source volume has been restored from the selected snapshot), and at operation 1155 the data associated with the write operation is written to the source volume.

Referring back to operation 1125, if the source volume does not share data with the snapshot that is the source of the restore for the RSEG(s) identified in the write operation, then control passes to operation 1135. If, at operation 1135 there is data in the snapshot then control passes to operation 1140 and the data from the snapshot is copied to the source volume. At operation 1145 the share bits in the source volume and its predecessor are updated to reflect they no longer share data for that RSEG. At operation 1150 the IRWrite bit in the source volume is set to a value that indicates that data in the source disk has been restored, and at operation 1150 the data associated with the write operation is written to the source volume.

By contrast, if at operation 1135 there is no data in the RSEG(s) of the snapshot identified in the write operation, then control passes to operation 1160 and the share bit value in the RSD is checked and the successor pointer in the LDSB is traversed until a snapshot that holds data in the RSEG is located. At operation 1165 the data is copied to the source volume and the snapshot selected for use in the restore operation. The copy operations implemented in operations 1140 and 1165 are implemented because copy operations may be executed at a block size that differs from the block size of a host write operation. For example, copy operations may be executed at a block size of 1 MB, while host write operations may be executed at much smaller block sizes, i.e., 4k, 8k, 16k, or 64k.

At operation 1170 the share bits in the snapshot selected for the restore operation are updated to reflect that the snapshot no longer shares data with a successor snapshot. Control then passes to operations 1145 to 1155, which are described above.

FIG. 12 is a flowchart illustrating operations in a method for managing read operations during a background copy process in accordance with an embodiment. The operations described in FIG. 12 may be implemented as a component of the background copy process of operation 940 of FIG. 9. Referring to FIG. 12, at operation 1210 a read operation is received in a controller that manages operations of the source volume. In one embodiment, the read operation may be received from a host computer and may identify one or more RSEGS which are to be read.

If, at operation 1214 the IRWrite bit in the source volume for the RSEG(s) identified in the read operation is set to a value that indicates that the RSEG(s) on the source volume have been written by the host during the restore operation, then control passes to operation 1220 and the source volume LMAP may be used to locate the data for the read operation. By contrast, if at operation 1214 the IRWrite bit is not set to a value that indicates that the RSEG on the source volume has been written by the host during the restore operation, then control passes to operation 1225. Starting at the snapshot that is the source of the restore the share bit value in the RSD is checked and the successor pointer in the LDSB is traversed until a snapshot that holds data in the RSEG is located. At operation 1230, the data is returned to the host.

Figure 13:
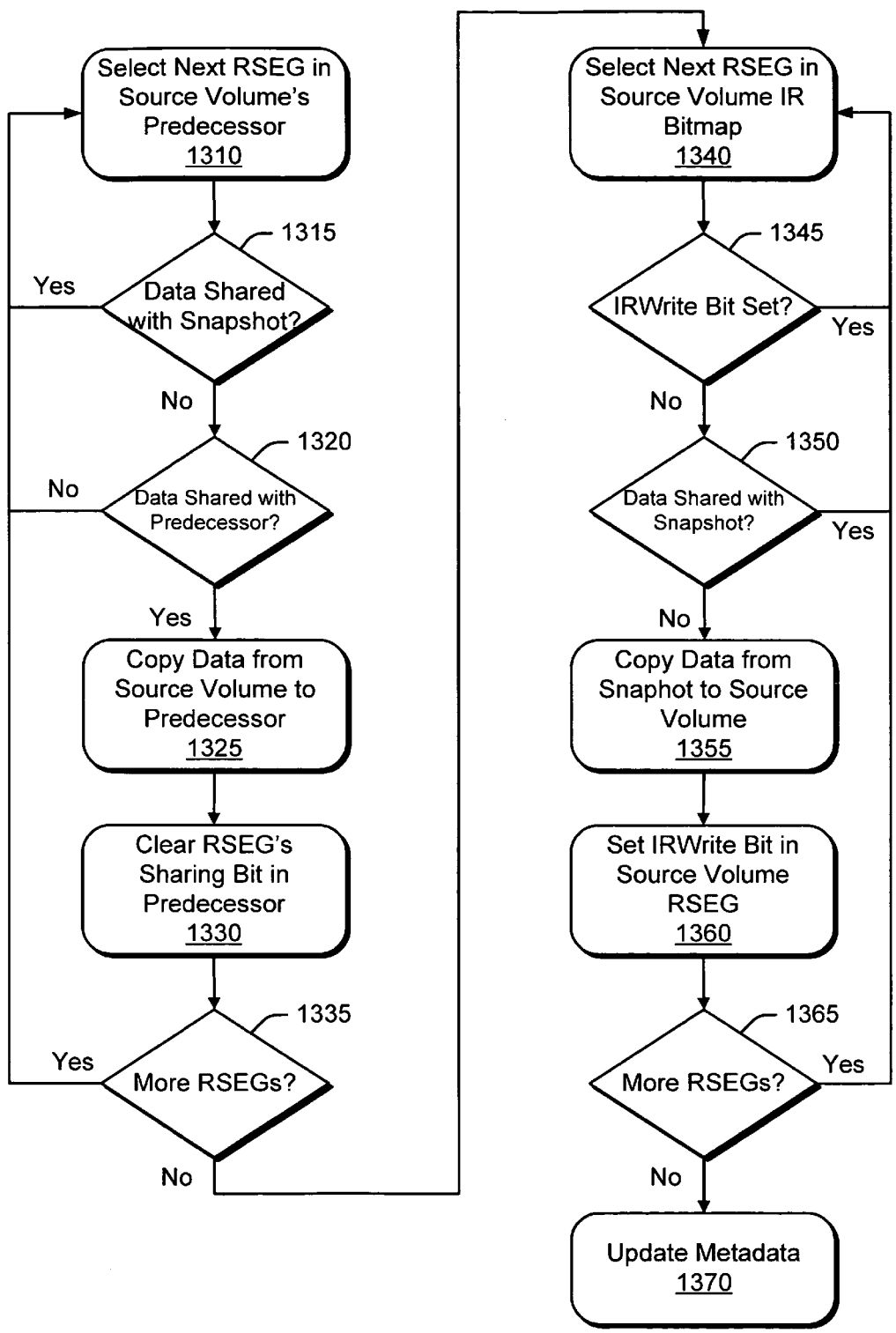
FIG. 13 is a flowchart illustrating operations in a background copy process in a storage network in accordance with an embodiment.
Figure 14:
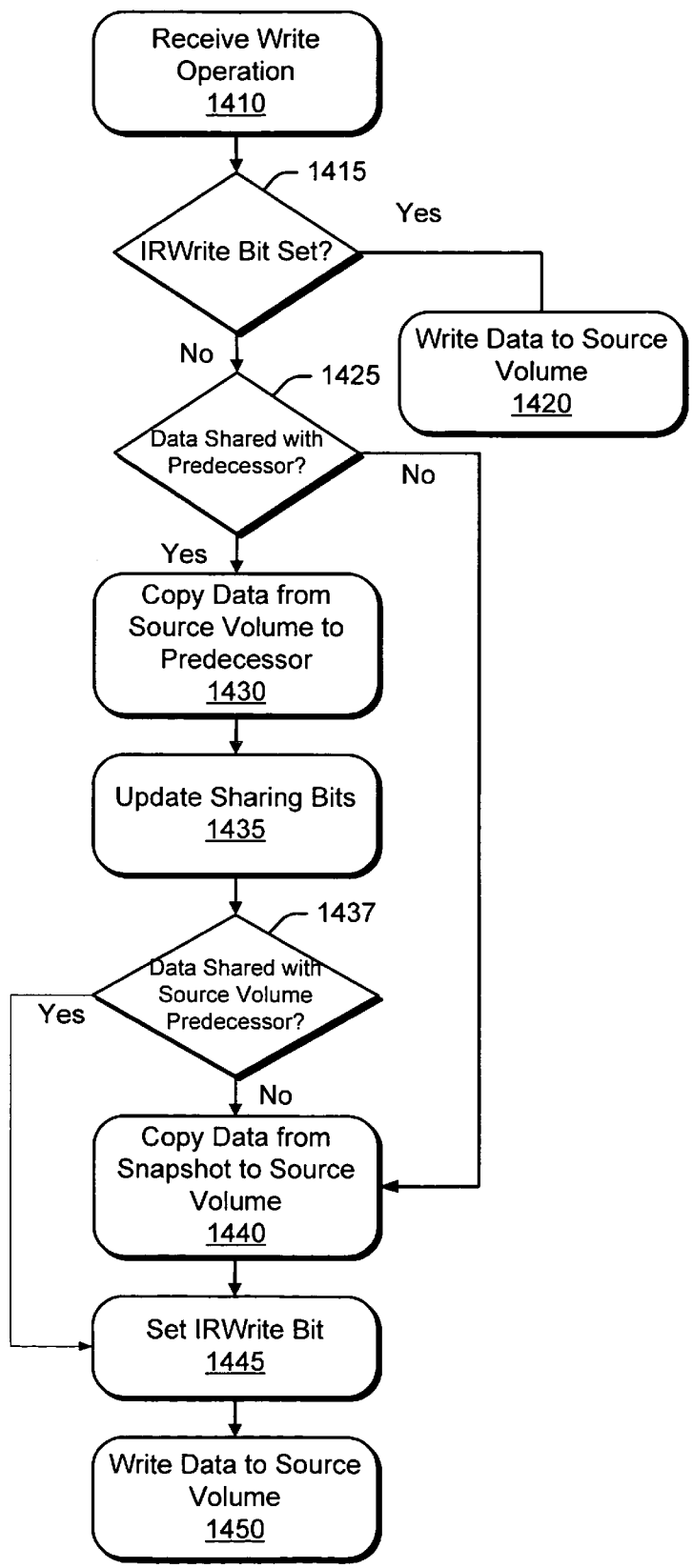
FIG. 14 is a flowchart illustrating operations in a method for managing write operations during a background copy process in accordance with an embodiment.
Figure 15:
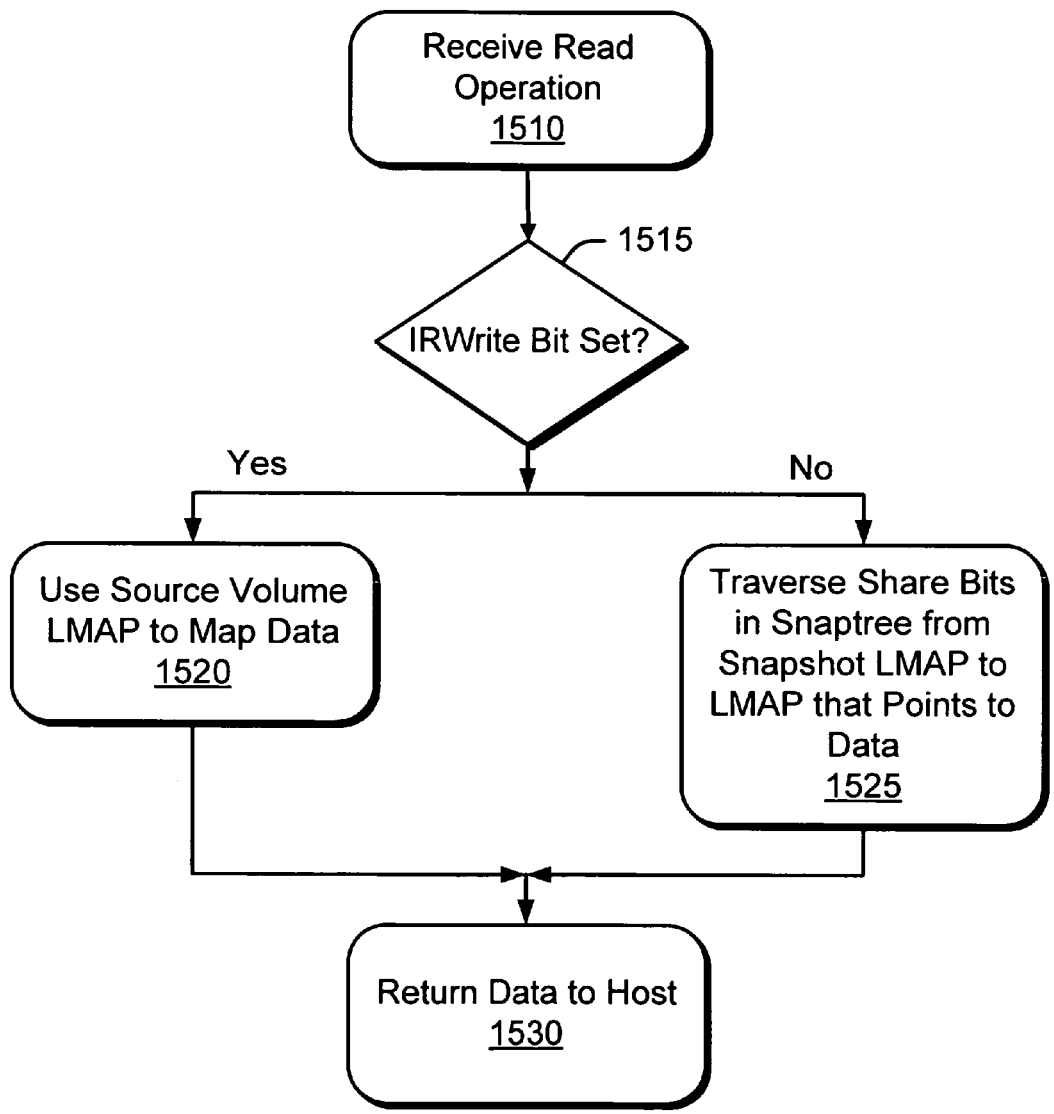
FIG. 15 is a flowchart illustrating operations in a method for managing read operations during a background copy process in accordance with an embodiment.

In another embodiment, a data restore operation may be implemented in a normal mode, in which data consistency is maintained in snapshots between the selected snapshot and the source volume. FIGS. 13-15 illustrate operations in a normal mode data restore operation. FIG. 13 is a flowchart illustrating operations in a background copy process in a storage network in accordance with an embodiment. The operations described in FIG. 13 may be implemented as a component of the background copy process of operation 935 of FIG. 9. In one embodiment, the background copy process traverses the memory map of the selected source volume and copies data from the snapshot selected as a point-in-time copy from which a source volume is to be restored. For efficiency and performance reasons of starting another restore before this one has completed, operations 1310-1335 unshare data from the source volume to its predecessor snapshot. This is done to maintain the data integrity of all snapshots in the snaptree and is not required in high performance mode. These operations are done first because they also may need to be done when a subsequent restore is started. Operations 1340-1370 restore data from the snapshot that is the source of the restore to the source volume Referring to FIG. 13, at operation 1310 the next RSEG in the source volume is selected. In the initial iteration, the "next" RSEG will correspond to the first RSEG in the source volume. If, at operation 1315, the source volume and the snapshot selected for the restore operation share the data in the RSEQ then control passes back to operation 1310 and the next RSEG in the source volume is selected. By contrast, if at operation 1315 the source volume and the snapshot selected for the restore operation do not share the data in the RSEQ, then control passes to operation 1320.

If, at operation 1320 the source volume does not share the data in the RSEG with a predecessor snapshot, then control passes back to operation 1310 and the next RSEG in the source volume is selected. By contrast, if at operation 1320 the source volume shares the data in the RSEG with a predecessor snapshot, then control passes to operation 1325 and the data in the source volume is copied to the predecessor snapshot. At operation 1330 the sharing bits in the RSEG(s) in the predecessor and source volume are cleared (i.e., set to a value which indicates that the data is not shared with the source volume).

If, at operation 1335 there are more RSEGs in the source volume, then control passes back to operation 1310 and the next RSEG is selected. Thus, operations 1310-1335 form a loop which traverses the RSEGs in the source volume and copies any data shared between the source volume and the predecessor snapshot to the predecessor snapshot.

If, at operation 1335 there are no more RSEGs in the source volume to analyze, then control passes to operations 1340-1365 in which an analogous process is implemented. At operation 1340 the next RSEG in the source volume is selected. In the initial iteration, the "next" RSEG will correspond to the first RSEG in the source volume. If, at operation 1340, the IRWrite bit in the source volume is set to a value that indicates that a write operation has been directed to the source volume during the data restore operation, then control passes back to operation 1340 and the next RSEG in the source volume is selected. By contrast, if at operation 1345 the IRWrite bit is not set, then control passes to operation 1350.

If, at operation 1350 the source volume shares the data in the RSEG with the snapshot selected for the restore operation, then control passes back to operation 1340 and the next RSEG in the source volume is selected. By contrast, if at operation 1350 the source volume does not share the data in the RSEG with the snapshot selected for the restore operation, then control passes to operation 1355 and the data in the snapshot is copied to the source volume. This data may reside in the snapshot itself or it may reside in a newer snapshot. Starting at the snapshot that is the source of the restore, the share bit value in the RSD is checked and the successor pointer in the LDSB is traversed until a snapshot that holds the data in the RSEG is located. At operation 1360 the IRWrite bit in the RSEG is set to a value that indicates that the RSEG has received a write operation during the instant restore operation.

If, at operation 1365 there are more RSEGs in the source volume, then control passes back to operation 1340 and the next RSEG is selected. Thus, operations 1340-1365 form a loop which traverses the RSEGs in the source volume and copies data shared with the snapshot selected for the restore operation to the source volume.

At operation 1370 the metadata is updated to reflect that there is no longer an instant restore operation between the source volume and the snapshot. In one embodiment, updating the metadata may include updating the IRWrite pointers in the source volume LDSB and the snapshot LDSB (FIG. 8) to indicate that the instant restore relationship no longer exists.

FIG. 14 is a flowchart illustrating operations in a method for managing write operations during a background copy process in accordance with an embodiment. The operations described in FIG. 14 may be implemented as a component of the background copy process of operation 940 of FIG. 9. Referring to FIG. 14, at operation 1410 a write operation is received in a controller that manages operations of the source volume and one or more snapshots. In one embodiment, the write operation may be received from a host computer and may identify one or more RSEGS which are to be written.

If, at operation 1415 the IRWrite bit is set for the RSEG(s) identified in the write operation, then control passes to operation 1420 and the data associated with the write operation is written to the source volume. By contrast, if at operation 1415 the IRWrite bit is not set to a value that indicates that the RSEG on the source volume has been written by the host, then control passes to operation 1425.

If, at operation 1425 the data in the RSEG(s) identified in the write operation is shared with the predecessor snapshot, then control passes to operation 1430 and the data is copied from the source volume RSEG to the predecessor snapshot. Control then passes to operation 1435 and the share bits in the source volume and predecessor snapshot RSEG are updated to reflect that the source volume no longer shares data with a predecessor snapshot.

If, at operation 1437, the snapshot does not share data with the source volume predecessor, then control passes to operation 1440 and the data from the RSEG in the snapshot selected for the restore operation is copied to the source volume. By contrast, if at operation 1437 data is not shared, then control passes to operation 1445.

At operation 1445 the IRWrite bit in the source volume is set to a value that indicates that data in the source disk has been restored, and at operation 1450 the data associated with the write operation is written to the source volume.

FIG. 15 is a flowchart illustrating operations in a method for managing read operations during a background copy process in accordance with an embodiment. The operations described in FIG. 15 may be implemented as a component of the background copy process of operation 940 of FIG. 9. Referring to FIG. 15, at operation 1510 a read operation is received in a controller that manages operations of the source volume. In one embodiment, the read operation may be received from a host computer and may identify one or more RSEGS which are to be read.

If, at operation 1515 the IRWrite bit in the source volume for the RSEG(s) identified in the read operation is set to a value that indicates that the RSEG(s) on the source volume have been written by the host during the restore operation, then control passes to operation 1520 and the source volume LMAP may be used to locate the data for the read operation. By contrast, if at operation 1515 the IRWrite bit is not set to a value that indicates that the RSEG on the source volume has been written by the host during the restore operation, then control passes to operation 1525 and starting at the snapshot that is the source of the restore, the share bit value in the RSD is checked and the successor pointer in the LDSB is traversed until a snapshot that holds data in the RSEG is located. At operation 1530, the data is returned to the host.

Thus, the operations of FIGS. 9-15 permit a storage controller to manage input/output operations while restore a source volume to a data state represented by a point-in-time copy (i.e., a snapshot) of the source volume. Because the copy operations are implemented in a background copy process and the source volume remains accessible during the background copy process, the restore operation appears as a substantially instant data restore operation to a user of the system. Because Instant Restore provides read and write access to all of the snapshot's data through the source volume before the background copy operation has completed, it allows host applications the ability to instantly verify the integrity of the restored data. If the data from the snapshot is also corrupt or does not meet the applications needs, the user may initiate a restore from another snapshot without waiting for the background copy to complete. This allows the user to try many restore points in a short amount of time to determine which one is best. In normal mode the data integrity of all snapshots, mirror clones and source volume in the entire snaptree is maintained throughout.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of restoring a source volume to a previous point in time data state, comprising:

receiving a signal that identifies a source volume and a first target snapshot that represents a point in time copy of the source volume;

updating metadata to define a restore relationship between the first target snapshot and the source volume;

executing a background copy process between the first target snapshot and the source volume; and managing input/output operations during the background copy process to permit input/output operations to the source volume during the background copy process, wherein receiving a signal that identifies a source volume and a first target snapshot that represents a point in time copy of the source volume comprises:

quiescing input/output operations to a snapshot cache and a cache of the source volume; and flushing the snapshot cache and the cache of the source volume to a storage disk.

2. The method of claim 1, further comprising updating metadata when the background copy process is complete to sever the restore relationship between the source volume and the first target snapshot.

3. The method of claim 1, wherein the background copy process comprises:

copying data from a logical storage segment in the first target snapshot to a corresponding logical storage segment in the source volume;

updating one or more sharing bits in the first target snapshot;

setting an IRWrite flag in the logical storage segment in the source volume to indicate that data has been written; and deleting one or more intermediate snapshots.

4. The method of claim 3, wherein managing input/output operations during the background copy process comprises:

receiving a write operation directed to the source volume;

writing data associated with the write operation to the source volume when the IRWrite flag indicates that the logical storage segment in the source volume as been written.

5. The method of claim 4, wherein the background copy process comprises:

copying data from a logical storage segment in the first target snapshot to a corresponding logical storage segment a source volume when the data in the first target snapshot is shared with the source volume; and clearing a share bit in the corresponding logical storage segment in a source volume when the data in the first target snapshot is not shared with the source volume.

6. The method of claim 1, wherein the background copy process comprises:

copying data from a logical storage segment in a source volume to a corresponding logical storage segment in a predecessor snapshot when the source volume shares data in the logical storage segment with a predecessor snapshot;

updating one or more sharing bits in the predecessor snapshot; copying data from a logical storage segment in the first target snapshot to a corresponding logical storage segment in the source volume when the first target snapshot does not share data in the logical storage segment with the predecessor snapshot; and setting an IRWrite flag in the logical storage segment in the source volume to indicate that data has been written.

7. The method of claim 1, further comprising initiating a restore operation between a second target snapshot and the source volume while the background copy process is being executed.

8. The method of claim 1, wherein executing a background copy process between the first target snapshot and the source volume comprises unquiescing the source volume thereby permitting input/output operations to be directed to the source volume.

9. The method of claim 8, further comprising after completion of the background copy process, unquiescing the snapshot cache thereby permitting input/output operations to be directed to the snapshot cache.

10. The method of claim 1, wherein the signal is received from a user interface.

11. A storage device, comprising:

a processor;

a memory module communicatively connected to the processor;

logic instructions in the memory module which, when executed by the processor, configure the processor to:

receive a signal that identifies a source volume and a first target snapshot that represents a point in time copy of the source volume;

update metadata to define an restore relationship between the first target snapshot and the source volume;

execute a background copy process between the first target snapshot and the source volume; and manage input/output operations during the background copy process to permit input/output operations to the source volume during the background copy process;

guiesce input/output operations to a snapshot cache and a cache of the source volume: and flush the snapshot cache and the cache of the source volume to a storage disk.

12. The storage device of claim 11, further comprising logic instructions in the memory module which, when executed by the processor, configure the processor to update metadata when the background copy process is complete to sever the restore relationship between the source volume and the first target snapshot.

13. The storage device of claim 11, further comprising logic instructions in the memory module which, when executed by the processor, configure the processor to:

copy data from a logical storage segment in the first target snapshot to a corresponding logical storage segment in the source volume;

update one or more sharing bits in the first target snapshot;

set an IRWrite flag in the logical storage segment in the sourced volume to indicate that data has been written; and delete one or more intermediate snapshots.

14. The storage device of claim 13, further comprising logic instructions in the memory module which, when executed by the processor, configure the processor to:

receive a write operation directed to the source volume;

write data associated with the write operation to the source volume when the IRWrite flag indicates that the logical storage segment in the source volume as been written.

15. The storage device of claim 14, further comprising logic instructions in the memory module which, when executed by the processor, configure the processor to:

copy data from a logical storage segment in the first target snapshot to a corresponding logical storage segment in a source volume when the data in the first target snapshot is shared with the source volume; and clear a share bit in the corresponding logical storage segment a source volume when the data in the first target snapshot is not shared with the source volume.

16. The storage device of claim 11, further comprising logic instructions in the memory module which, when executed by the processor, configure the processor to:

copy data from a logical storage segment in a source volume to a corresponding logical storage segment in a predecessor snapshot when the source volume shares data in the logical storage segment with the predecessor snapshot;

update one or more sharing bits in the predecessor snapshot;

copy data from a logical storage segment in the first target snapshot to a corresponding logical storage segment in the source volume when the first target snapshot does not share data in the logical storage segment with the predecessor snapshot; and set an IRWrite flag in the logical storage segment in the source volume to indicate that data has been written.

17. The storage device of claim 11, further comprising logic instructions in the memory module which, when executed by the processor, configure the processor to initiate a restore operation between a second target snapshot and the source volume while the background copy process is being executed.

18. The storage device of claim 11, further comprising logic instructions in the memory module which, when executed by the processor, configure the processor to unquiesce the source volume thereby permitting input/output operations to be directed to the source volume.

19. The storage device of claim 18, further comprising logic instructions in the memory module which, when executed by the processor, configure the processor to unquiesce the snapshot cache thereby permitting input/output operations to be directed to the snapshot cache.

20. A computer program product comprising logic instructions stored on a computer-readable medium which, when executed by a processor, configure the processor to:

receive a signal that identifies a source volume and a first target snapshot that represents a point in time copy of the source volume; update metadata to define an restore relationship between the first target snapshot and the source volume;

execute a background copy process between the first target snapshot and the source volume; and manage input/output operations during the background copy process to permit input/output operations to the source volume during the background copy process;

quiesce input/output operations to a snapshot cache and a cache of the source volume; and flush the snapshot cache and the cache of the source volume to a storage disk.

21. The computer program product of claim 20, further comprising logic instructions in the memory module which, when executed by the processor, configure the processor to update metadata when the background copy process is complete to sever the restore relationship between the source volume and the first target snapshot.

22. The computer program product of claim 20, further comprising logic instructions in the memory module which, when executed by the processor, configure the processor to:

copy data from a logical storage segment in the first target snapshot to a corresponding logical storage segment in the source volume;

update one or more sharing bits in the first target snapshot;

set an IRWrite flag in the logical storage segment in the sourced volume to indicate that data has been written; and delete one or more intermediate snapshots.

23. The computer program product of claim 22, further comprising logic instructions in the memory module which, when executed by the processor, configure the processor to:

receive a write operation directed to the source volume;

write data associated with the write operation to the source volume when the IRWrite flag indicates that the logical storage segment in the source volume as been written.

24. The computer program product of claim 20, further comprising logic instructions in the memory module which, when executed by the processor, configure the processor to:

copy data from a logical storage segment in the first target snapshot to a corresponding logical storage segment in a source volume when the data in the first target snapshot is shared with the source volume; and clear a share bit in the corresponding logical storage segment a source volume when the data in the first target snapshot is not shared with the source volume.

25. The computer program product of claim 20, further comprising logic instructions in the memory module which, when executed by the processor, configure the processor to:

copy data from a logical storage segment in a source volume to a corresponding logical storage segment in a predecessor snapshot when the source volume shares data in the logical storage segment with the predecessor snapshot;

update one or more sharing bits in the predecessor snapshot;

copy data from a logical storage segment in the first target snapshot to a corresponding logical storage segment in the source volume when the first target snapshot does not share data in the logical storage segment with the predecessor snapshot; and set an IRWrite flag in the logical storage segment in the source volume to indicate that data has been written.

26. The computer program product of claim 20, further comprising logic instructions in the memory module which, when executed by the processor, configure the processor to unquiesce the source volume thereby permitting input/output operations to be directed to the source volume.

27. The computer program product of claim 26, further comprising logic instructions in the memory module which, when executed by the processor, configure the processor to unquiesce the snapshot cache thereby permitting input/output operations to be directed to the snapshot cache.

* * * * *

UNITED STATES PATENT AND TRADEMARK OFFICE
CERTIFICATE OF CORRECTION

| | | |
|---|---|---|
| PATENT NO. | : 7,467,268 B2 | Page 1 of 1 |
| APPLICATION NO. | : 11/404240 | |
| DATED | : December 16, 2008 | |
| INVENTOR(S) | : Aaron Lindemann et al. | |

It is certified that error appears in the above-identified patent and that said Letters Patent is hereby corrected as shown below:

On the Title page, in field (54), in column 1, in "Title", lines 1-3, delete "CONCURRENT DATA RESTORE AND BACKGROUND COPY OPERATIONS IN STORAGE NETWORKS" and insert -- DATA RESTORE OPERATIONS IN STORAGE NETWORKS --, therefor.

In column 1, lines 1-3, delete "CONCURRENT DATA RESTORE AND BACKGROUND COPY OPERATIONS IN STORAGE NETWORKS" and insert -- DATA RESTORE OPERATIONS IN STORAGE NETWORKS --, therefor.

In column 10, line 29, delete "RSEC;" and insert -- RSEG, --, therefor.

In column 14, line 9, delete "RSEC," and insert -- RSEG, --, therefor.

In column 14, line 13, delete "RSEQ" and insert -- RSEG, --, therefor.

In column 18, line 42, delete "RSEQ" and insert -- RSEG, --, therefor.

In column 18, line 45, delete "RSEQ" and insert -- RSEG --, therefor.

In column 22, line 24, in Claim 11, delete "guiesce" and insert -- quiesce --, therefor.

In column 22, line 25, in Claim 11, delete "volume:" and insert -- volume; --, therefor.

Signed and Sealed this

Twenty-second Day of June, 2010

David J. Kappos
*Director of the United States Patent and Trademark Office*